United States Patent
Boeen et al.

(10) Patent No.: US 11,048,472 B2
(45) Date of Patent: Jun. 29, 2021

(54) DYNAMICALLY ADJUSTABLE SOUND PARAMETERS

(71) Applicant: Listen AS, Oslo (NO)

(72) Inventors: Anders Boeen, Oslo (NO); Joachim Jacobsen, Oslo (NO); Helge Bod Vangen, Oslo (NO); Snorre Vevstad, Oslo (NO)

(73) Assignee: Listen AS, Oslo (NO)

( * ) Notice: Subject to any disclaimer, the term of this patent is extended or adjusted under 35 U.S.C. 154(b) by 0 days.

(21) Appl. No.: 16/751,703

(22) Filed: Jan. 24, 2020

(65) Prior Publication Data
US 2020/0241834 A1    Jul. 30, 2020

Related U.S. Application Data

(60) Provisional application No. 62/797,303, filed on Jan. 27, 2019.

(51) Int. Cl.
| | |
|---|---|
| *H04R 29/00* | (2006.01) |
| *G06F 3/16* | (2006.01) |
| *G10L 25/51* | (2013.01) |
| *G06N 3/08* | (2006.01) |
| *H04R 1/10* | (2006.01) |
| *G10L 25/30* | (2013.01) |

(52) U.S. Cl.
CPC .............. *G06F 3/165* (2013.01); *G06N 3/08* (2013.01); *G10L 25/30* (2013.01); *G10L 25/51* (2013.01); *H04R 1/1041* (2013.01); *H04R 29/001* (2013.01)

(58) Field of Classification Search
CPC ...................................................... H04R 29/00
See application file for complete search history.

(56) References Cited

U.S. PATENT DOCUMENTS

| | | | |
|---|---|---|---|
| 2015/0358718 A1* | 12/2015 | Kaller ................. | H04R 1/1041 381/56 |
| 2016/0165336 A1* | 6/2016 | Di Censo ............... | G06F 3/165 381/80 |
| 2016/0188285 A1* | 6/2016 | Luk ......................... | G06F 3/165 700/94 |
| 2017/0075422 A1* | 3/2017 | Sun ......................... | G06F 3/015 |
| 2017/0295272 A1* | 10/2017 | Gan ..................... | H04M 1/6041 |
| 2019/0045298 A1* | 2/2019 | Klemme .................. | A61B 5/11 |
| 2020/0081683 A1* | 3/2020 | Cremer ................... | G10L 19/00 |
| 2020/0092644 A1 | 3/2020 | Alders et al. | |
| 2020/0118544 A1 | 4/2020 | Lee et al. | |
| 2020/0151519 A1 | 5/2020 | Anushiravani et al. | |
| 2020/0184985 A1 | 6/2020 | Nesta et al. | |
| 2020/0186378 A1 | 6/2020 | Six et al. | |
| 2020/0260198 A1* | 8/2020 | Andersen ............. | H04R 25/507 |
| 2020/0293270 A1 | 9/2020 | Boeen et al. | |

* cited by examiner

*Primary Examiner* — Olisa Anwah
(74) *Attorney, Agent, or Firm* — Fish & Richardson P.C.

(57) ABSTRACT

Embodiments may relate to a wearable audio device. The wearable audio device may be configured to generate a data related to a sound environment in which the wearable audio device is located, and transmit an indication of that data to a computing device that is located remote from the wearable audio device. The wearable audio device may further be able to receive an indication of an audio signal parameter that is based on the data, and generate an audio signal based on the audio parameter. Other embodiments may be described or claimed.

18 Claims, 17 Drawing Sheets

```
┌─────────────────────────────────────────────────────────────────┐
│ Identifying an environmental parameter generated by a wearable  │
│ audio device that is remote from the electronic device, wherein │
│ the environmental parameter is related to a sound environment   │
│ in which the wearable audio device is located                   │
│                            1501                                 │
└─────────────────────────────────────────────────────────────────┘
                                │
                                ▼
┌─────────────────────────────────────────────────────────────────┐
│ Identifying, based on the environmental parameter and a         │
│ pre-identified weight, an audio parameter to be used by the     │
│ wearable audio device for an audio signal, wherein the          │
│ pre-identified weight relates to sound environment classification│
│                            1502                                 │
└─────────────────────────────────────────────────────────────────┘
                                │
                                ▼
┌─────────────────────────────────────────────────────────────────┐
│            Outputting an indication of the audio parameter      │
│                            1503                                 │
└─────────────────────────────────────────────────────────────────┘
```

Figure 15

Identifying a first weight related to classification, based on an audio parameter, of a sound environment in which a remote wearable audio device is located
1601

Identifying a second weight related to a parameter setting for the remote wearable audio device
1602

Identifying a third weight related to sound level of the sound environment
1603

Storing the first weight, second weight, and third weight in the database
1604

Figure 16

DYNAMICALLY ADJUSTABLE SOUND PARAMETERS

CROSS-REFERENCE TO RELATED APPLICATION

This application claims the benefit of U.S. Provisional Patent Application 62/797,303, filed on Jan. 27, 2019, the subject matter of which is hereby incorporated by reference in its entirety.

BACKGROUND

Typically, hearing aids may amplify frequencies that users have trouble hearing. These frequencies may generally be in the range between approximately 0 Hertz (Hz) and approximately 8,000 Hz for age-related hearing loss. Additionally, active noise cancellation headsets may capture ambient sounds and produce counter or inverse sounds that cancel some frequencies. These frequencies may typically be in the range of between approximately 0 Hz and approximately 2000 Hz. Legacy active noise cancellation headsets may offer pass-through functionality so that the user may keep the headset on, but avoid being blocked out from ambient sounds. The "pass-through" function that some wearable audio devices have implemented may amplify any sounds in the environment and output those sounds to the ear, so that the user may be aware of their surroundings.

BRIEF DESCRIPTION OF THE DRAWINGS

FIG. 15 depicts an example simplified technique for use by a neural network, in accordance with various embodiments.

FIG. 16 depicts an example simplified technique for training a neural network, in accordance with various embodiments.

DETAILED DESCRIPTION

Figure 1:
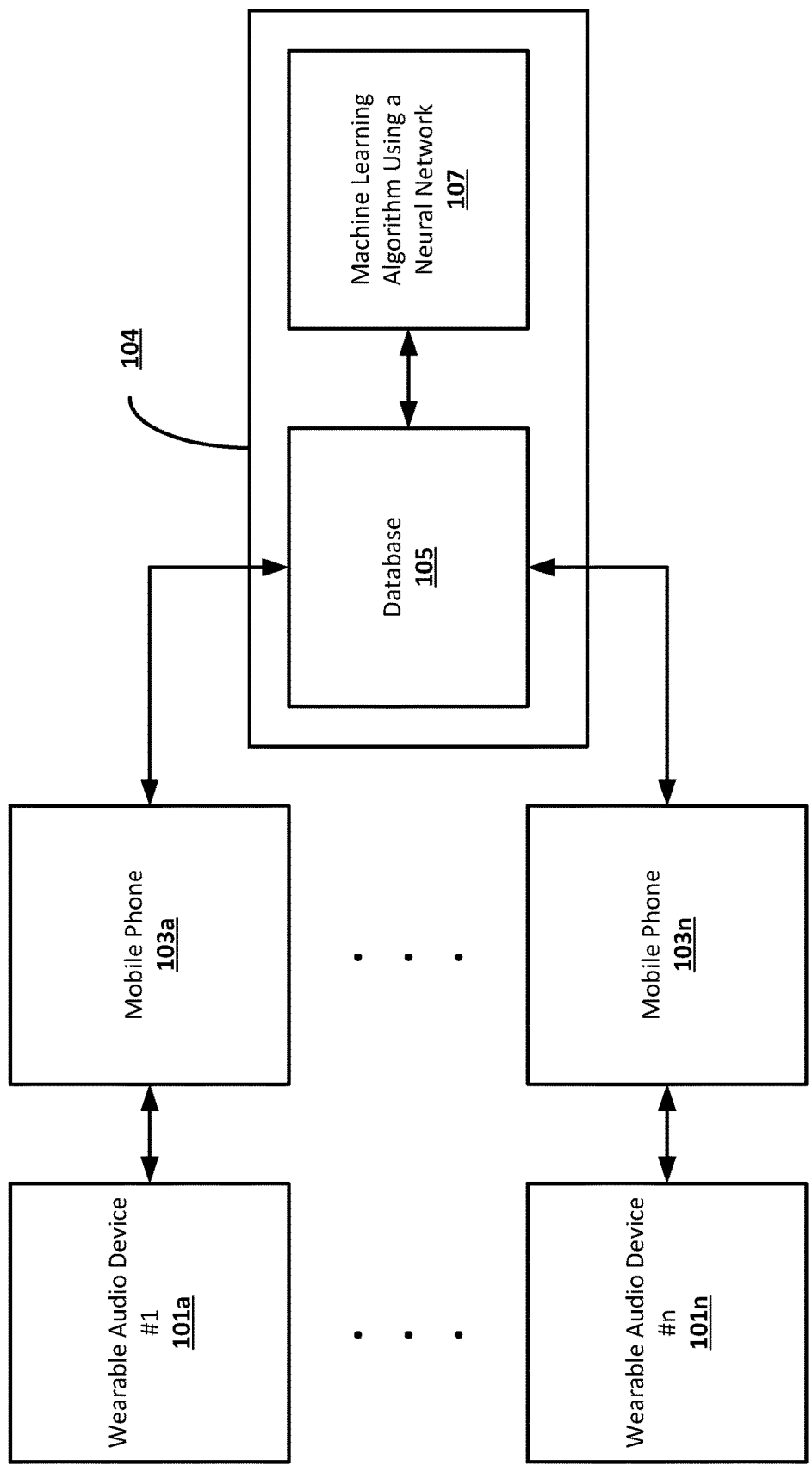
FIG. 1 depicts a simplified view of a system architecture related to the use of dynamically adjustable sound parameters produced by a neural network, in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent.

Generally, embodiments herein relate to wearable audio devices such as earbuds, headsets, etc. In particular, embodiments relate to the use of such wearable audio devices to improve voice detection, reduce noise, or otherwise enhance audio in a changing environment based on an artificial intelligence prediction.

As noted, legacy hearing aids may generally amplify frequencies from between approximately 0 Hz and approximately 8000 Hz for age-related hearing loss. Legacy active noise cancellation headsets may cancel frequencies between approximately 0 Hz and approximately 2000 Hz. While the active noise cancellation headsets or the hearing aids may offer a pass-through function, they may not attenuate noise or improve voice.

One challenge that may be presented with legacy hearing aids or legacy noise cancellation headsets may be to allow the user of a wearable audio device to select specific sounds for enhancement, while cancelling other sounds or noise, irrespective of frequency. This challenge may be referred to as the "cocktail party situation," which may refer to the challenge of following a conversation in a sound environment of many people talking, background music, and other sounds that may disturb a conversation or otherwise hinder speech intelligibility.

Generally, the world includes a variety of sounds at a variety of frequencies. To protect hearing health, and to be able to hear a desired type or amount of sound (e.g., sound at a specific volume, a specific conversation, a specific frequency, etc.) it may be desirable to reduce exposure to all sound. Moreso, it may be desirable to be able to select sounds that are desirable in noisy environments. When a person is in an environment with voices and multiple background sounds, it may be difficult for that person to have a conversation. Further, exposure to a loud environment may cause one to become mentally tired, or may damage an individual's hearing over time.

As noted, legacy hearable devices such as hearing aids may include some form of noise reduction algorithms that may focus on removing background noise. However, there may still be a desire with respect to these devices for improved voice enhancement or noise reduction. Embodiments herein may provide for a wearable audio device that enables such improvements.

As used herein, a "wearable audio device" may refer to a device which may be worn by a user in some form and which may include one or more speakers to emit sound. Such a device may be, for example, one or more earbuds, in-ear headphones, over-ear headphones, some other type of device, or combinations thereof. Generally, the wearable audio device may be seen as a tool for allowing a user to hear sounds generated by the wearable audio device. Earbuds or in-ear headphones may be desirable in particular because they may allow for noise isolation from other sounds while not being so obvious that they discourage other individuals from speaking to the user.

One specific embodiment may relate to a platform of hardware and software with algorithms running on multiple device. A first part of the algorithm may be executed on the wearable audio device. A second part of the algorithm may be executed on a mobile phone or other wireless mobile device. A third part of the algorithm may be executed on a server.

The wearable audio device may include one or more microphones, one or more speakers, one or more batteries, one or more sensors, one or more processing units, and one or more transmit or receive modules (e.g., a transceiver or separate transmit and receive modules) which are able to transmit or receive wireless audio signals. The sensors may be, for example, a proximity sensor, a capacitive sensor, an accelerometer, a gyroscope, a magnetometer, a carbon dioxide ($CO_2$) sensor, a total volatile organic compound (TVOC) sensor, a humidity sensor, a temperature sensor, an air pressure sensor, or some other type of sensor. The processing units may be, for example, a processing unit such as a central processing unit (CPU), a single or multi-core processor, a core of a processor, a general processing unit (GPU) or some other type of processing unit. The wireless audio signals may be, for example, a wireless signal such as a WIFI signal, a Bluetooth® signal, or a cellular signal such as a third generation (3G), fourth generation (4G), or fifth generation (5G) signal, or some other type of wireless signal. In some embodiments, the transceiver and the type of wireless signal may be based on whether the wearable audio device is communicating with the server through the mobile device, or whether the wearable audio device is configured to communicate directly with a cellular tower and bypass the mobile device. The sound output from the algorithm may be output by a speaker of the wearable audio device, or it may be an analog output or digital signal sent to another device, or some other type of sound output. For example, the wearable audio device may include a pair of earbuds wherein the algorithm is run on a first earbud, the output is transmitted to the second earbud, and then the sound is output from the second earbud. Other variations may be present in other embodiments.

In some embodiments, the algorithm may be receptive to inputs provided by a user through a user-accessible interface such as a GUI, a voice command, a motion command, an eye command, or some other type of command. In some embodiments, the user-accessible interface may at least partially be an interface of the mobile device, whereas in other embodiments the user-accessible interface may be at least partially separate from the mobile device.

Based on sounds detected in the environment by one or more of the microphones of the wearable audio device, the user may be able to select how much they would like to attenuate, remove, amplify, enhance, or other alter one or more sounds such as specific noises, specific frequencies, specific voices, etc. In some embodiments, the user may be able to adjust parameters such as amplifying or quieting all sounds, adjusting the amplification or sound-reduction to specific individual hearing needs or preferences, or splitting voice and noise parameters to reduce amplification of all other sounds than a nearby voice. Generally, the user may be able to create, alter, or otherwise modify sounds to achieve the best comfort, joy, intelligibility, and clarity for the user in a given sound environment. Additional improvements in sound quality may be achieved by measuring the orientation of the head with various of the sensors of the wearable audio device such as an accelerometer, a magnetometer, an air pressure sensor, a gyroscope, or identification of the orientation of the head to focus a beamformer.

In one particular embodiment, the mobile phone may include an executable application wherein a user GUI may be provided to adjust the output of the wearable audio device. The application may enable the mobile phone to transmit provided user feedback to a database located in a server. On the server, a neural network may be running, and the neural network may predict sound parameters based on the user feedback and data from the database. The sound parameters may then be transmitted back to the wearable audio device (either directly or through the mobile phone) and used by the wearable audio device to generate an audio signal as described above.

In some embodiments, sensors may be enabled to guide users to be aware of their sound environment (which may be referred to as a user's "soundlife") and alert a user when they are exposed to sound pollution (e.g., sound above a specific decibel level, sound above a given level for a certain amount of time, etc.). Other sensors such as a $CO_2$ sensor, a TVOC sensor, a humidity sensor, a temperature sensor, a particulate matter sensor, etc. may allow the wearable audio device to provide feedback related to whether a user is exposed to air pollution. Additionally, through use of an ultraviolet (UV) sensor on the wearable audio device, a user may be enabled to monitor their sun exposure and identify the amount of sun that they are exposed to in given time period.

One embodiment may allow for a dynamic reduction of sounds specified as "noise" by a user, and enhancement of desirable sounds such as voice. Such a reduction and enhancement may be specified as "dynamic" because it may allow for the reduction and enhancement as the sounds change in real-time. As one example, if there is a piano playing, a fan bowing, and a human talking, then the user may amplify the human talking while reducing the other sounds (e.g. the fan and the piano) that are defined as "noise" by the user. Through the use of a neural network and classifying sound types in the environment, the wearable audio device may be provided with control parameters that attenuate or reduce the sound types that the user has identified as "noise."

In one embodiment, the wearable audio device may record ambient sound level and correlate the sound level with geo-location data (e.g., which may be identified by the mobile device), and transmit the sound information and the geo-location information to the server, where it may be stored in a server-located database. With the correlated sound level and the geo-location information, a noise-pollution map may be created from information from one or more wearable audio devices. With this map, users may be informed about their daily exposure of sound level, receive suggestions of places with lower sound levels, identify roads that include loud construction or vehicle noise, etc. Noise maps may also be used by institutions such as governments for planning purposes such as building new schools, homes, daycares, parks, etc.

At a high level of generality, embodiments herein may solve one or more of the above-described issues of legacy wearable audio devices by providing a method of training algorithms to identify ambient sounds dynamically. Some embodiments may provide a method of training algorithms to allow a user to select the sounds that the user wants to hear. Some embodiments my provide a wearable audio device (e.g., earbud(s), headphone(s), etc.) that enhance sounds in situations such as conversations, both technically and socially.

FIG. 1 depicts a simplified view of a system architecture related to the use of dynamically adjustable sound parameters produced by a neural network, in accordance with various embodiments. The system architecture may include a number of wearable audio devices such as wearable audio devices 101a-101n. It will be understood that the designation "n" is intended to refer to an un-specified number of wearable audio devices which may be present in the system. The wearable audio devices 101a-101n may be, for example, earbuds, in-ear headphones, over-ear headphones, or some other type of wearable audio device. In some embodiments, different ones of the different wearable audio devices 101a-101n may have different form factors. For example, one of the wearable audio devices may be a singular earbud, while another of the wearable audio devices may be a pair of earbuds, a type of headphones, etc.

Respective ones of the wearable audio devices 101a-101n may be communicatively coupled with a mobile device 103a-103n. In the embodiment of FIG. 1, the mobile device may be a mobile phone. In other embodiments, one or more of the mobile devices may be some other type of mobile device such as a smartwatch, a personal digital assistant (PDA), or some other type of mobile device. In some embodiments, a wearable audio device(s) 101a-101n may be communicatively coupled with a respective mobile device 103a-103n through a short-range wireless protocol such as Bluetooth, WIFI, or some other wireless protocol. In some embodiments, one or more of the wearable audio devices 101a-101n may be communicatively coupled with a mobile device 103a-103n through a wired connection (e.g., such as a headphone jack or some other wired connection that is removable or hardwired). In some embodiments, one or more of the wearable audio devices 101a-101n may share a form factor with a mobile device such that a separate mobile device is un-necessary. In other words, one or more of the wearable audio devices 101a-101n may include a cellular wireless transceiver and processor such that the mobile phone is un-necessary. In this embodiment, the wearable audio device may be configured to communicate directly with a cellular tower via a protocol such as a 3G, 4G, 5G, or some other type of wireless cellular protocol.

The mobile devices 103a-103n may be communicatively coupled with a server 104 which may include a database 105 and a neural network 107. The mobile devices 103a-103n may be communicatively coupled with the server 104 by way of one or more wireless protocols such as a cellular protocol as described above, or some other wireless protocol. Generally, the database 105 may store information related to one or more parameters, weights, historical audio data, historical geographic data, etc. The neural network 107 may perform one or more calculations related to the information stored in the database 105 to provide one or more audio parameters to the wearable audio device(s) 101a-101n. Operation of the neural network 107 and the database 105 is provided in greater detail below.

In general, it will be understood that although the server 104 is depicted as a unitary element, in some embodiments the server 104 may include a plurality of networked servers, a plurality of server blades, etc. Such an embodiment may be referred to as a "server farm." Additionally, it will be understood that the database 105 may be stored on a plurality of non-transitory memories such as a double data rate (DDR) memory, a nonvolatile memory (NVM), or some other type of memory. Similarly, it will be understood that the neural network 107 may be enabled across one or more processors/CPUs/GPUs/processor cores/etc. of the one or more servers 104. Typically, such an embodiment may be scalable such that the neural network 107, the database 105, and the server 104 may be expanded or contracted based on the degree of need of such an embodiment. In some embodiments, the neural network 107 may be spread across various of the elements of the system architecture and at least part of the neural network 107 may be offloaded from the server 104 and stored on a mobile device, a wearable audio device, both, etc. The portion of the neural network 107 may additionally or alternatively be executed, run, etc. on the mobile device/wearable audio device/etc.

Typically, in operation, a wearable audio device (e.g., wearable audio device 101a) may collect data during usage of sound level, sensor data from sensors on the wearable audio device, statistics from the sound algorithm running on the wearable audio device, sound data (e.g., recorded sound clips), etc. The data may be sent to a mobile device (e.g., mobile device 103a) where additional data may be added to the payload received from the wearable audio device. The additional data may be, for example, user feedback (e.g., through the application on the mobile device), user data, geo-location data, a timestamp, user feedback data, a unique identifier (ID) which may be random or fixed, etc. The data packet including the data from the wearable audio device and the mobile device may be transmitted to the server 104 and appended to the database 105 for future processing.

The neural network 107 may process one or more elements of the data received from the mobile device(s) 103a-103n. For example, the neural network 107 may classify sound types of sound clips recorded by the wearable audio device(s) 101a-101n. For example, the neural network 107 may classify the sound clip as relating to a fan, a motor engine, an instrument, and animal, a male or female speaker, an environment such as a coffeeshop or airplane, etc. The neural network 107 may also identify sound environments based on background noise of the sound clip(s). The neural network 107 may also calculate control parameters for the environment in which a specific wearable audio device is located, calculate audio parameters for use by a wearable audio device (e.g., beamforming parameters or some other parameter), etc. In some embodiments, the neural network 107 may further be configured to generate a noise map, or perform one or other processing elements. In some embodiments, the user feedback may be used to train the neural network 107. For example, the neural network 107 may take into account user application settings, user classification of the sound environment, the quality of sound, etc. As a result, the neural network 107 may generate one or more control parameters which may be output to the wearable audio device(s) 101a-101n. The control parameters may include, for example, control parameters such as a beamformer parameter, an equalizer setting, a noise cancellation setting, a noise reduction setting, or some other control parameter.

Figure 2:
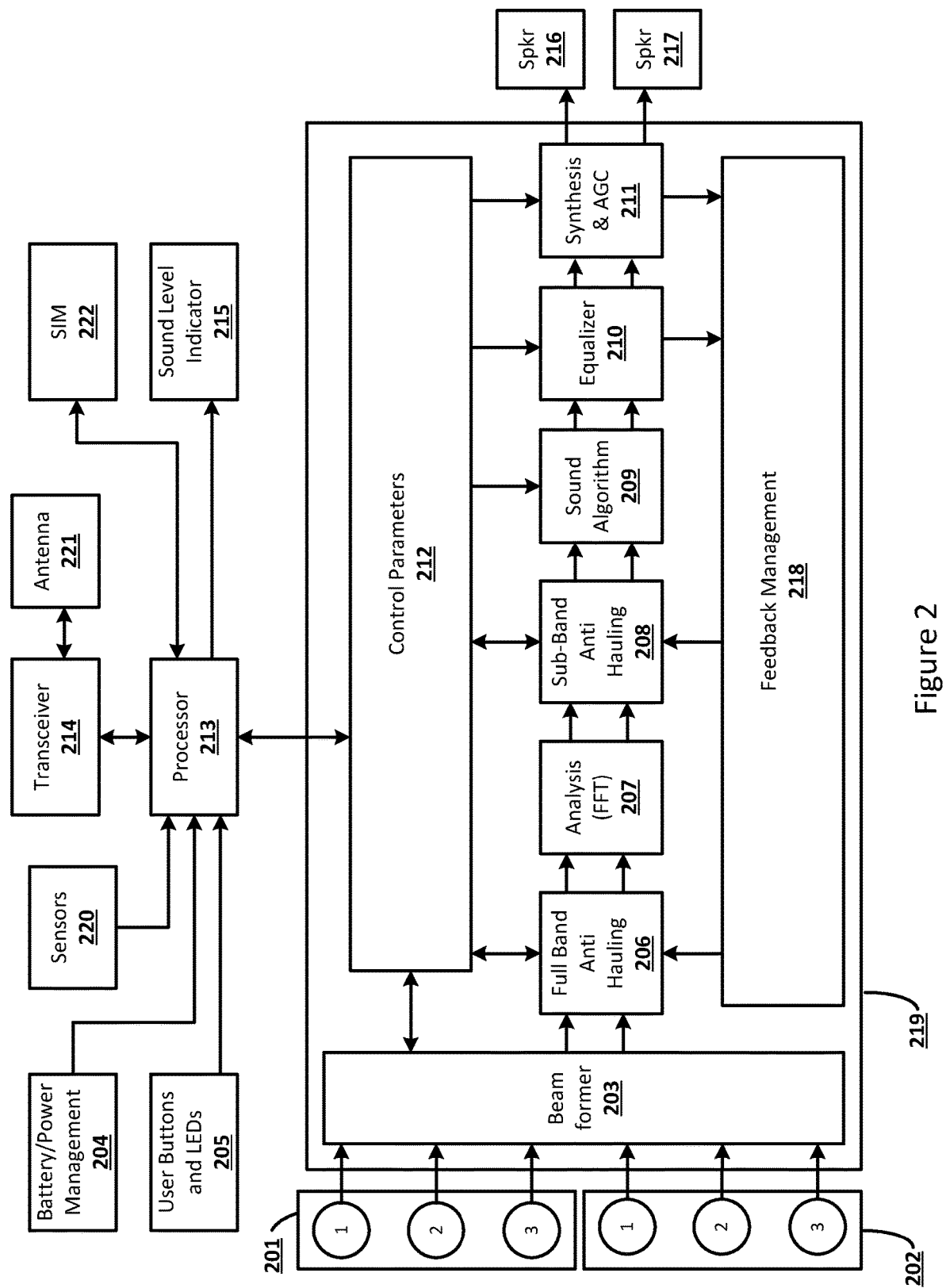
FIG. 2 depicts a simplified view of a system of a wearable audio device, in accordance with various embodiments.

FIG. 2 depicts a simplified view of a system of a wearable audio device, in accordance with various embodiments. It will be understood that the embodiment of FIG. 2 is intended as an example embodiment, and other embodiments may vary from that depicted in FIG. 2. For example, in some embodiments the wearable audio device may include more or fewer elements than depicted, elements in a different configuration, etc. In some embodiments all of the elements in FIG. 2 may be located in a single housing, whereas in other embodiments the elements may be distributed across two or more physical housings while remaining communicatively coupled to one another. The wearable audio device may be similar to, for example, one of wearable audio devices 101a-101n.

The wearable audio device may include one or more microphones 201 and 202. As shown, the wearable audio device may include a total of six microphones (respectively labeled "1," "2," and "3"). The microphones 201 and 202 may be located on opposite sides of the wearable audio device. For example, microphones 201 may be located on the left side of the wearable audio device while microphones 202 may be located on the right side of the wearable audio device.

The wearable audio device may further include one or more speakers 216 and 217. The speakers 216 or 217 may be used to output sound. In various embodiments, the speakers 216 or 217 may be implemented as a single speaker per ear, multiple speakers to create three-dimensional (3D) awareness by directing the sound in the ear, etc. In some embodiments, if multiple speakers are present, the multiple speakers may be configured in an array to perform beamforming of the output sound toward the user.

The wearable audio device may further include a processor 213 which may be, for example, a CPU, a GPU, a processing core, etc. as described above. Generally, the processor 213 may control the wearable audio device and interface to a mobile device such as mobile devices 103a-103n as described above.

The wearable audio device may further include a sound processor unit 219 which may include a variety of modules as will be described in detail below. Generally, an audio signal may traverse between the different modules of the sound processor 219 (e.g., from the microphones 201/202 to the speakers 216/216) as depicted in FIG. 2 and as described below. Generally, the sound processor unit 219 may be composed of or otherwise include an application-specific integrated circuit (ASIC), a digital signal processor (DSP), a processor (CPU, GPU, processor core, etc.), or some other type of logic or processing unit. At a high level, the sound processor unit 219 may run the algorithm used to process the signals from the microphones 201 or 202, sound signals received from the processor 213, or some other audio signals. The processed signals may be output to the processor 213, the speakers 216/217, or some other element. More generally, the sound processor unit 219 may be optimized to run one or more elements of the neural network 107, predict output of neural network, or calculate weights used for the sound processing.

The microphones 201 and 202 may be communicatively coupled with a beamforming module 203 of the sound processing unit 219. The beamforming module 203 may calculate one or more parameters for use by the speakers 216 or 217 during generation and transmission of an audio signal by speakers 216 or 217. The parameters may be fix control parameters or adaptive beamforming parameters that adapt to the environment. The adaptive beamforming parameters may be based on information collected from an orientation sensor and may be affected by or compensate for head orientation. The beamforming module may operate in time domain or frequency domain.

The sound processing unit 219 may further include an anti-hauling module 206. The anti-hauling module 206 may be referred to as a "full-band" anti-hauling module. The anti-hauling module 206 may operate in the time domain, and reduce feedback created by the microphones 201 or 202 picking up sound from the speakers 216 or 217.

The sound processing unit 219 may further include an analysis module 207 which may be configured to, for example, convert a signal from the time domain to the frequency domain. Specifically, the analysis module 207 may be configured to perform a fast Fourier transform (FFT) or some other operation which may convert from the time domain to the frequency domain.

The sound processing unit 219 may further include a second anti-hauling module 208. The anti-hauling module 208 may be referred to as a "sub-band" anti-hauling module. The anti-hauling module 208 may operating in the frequency domain and further reduce feedback created by the microphones 201 or 202 picking up sound from the speakers 216 or 217.

The sound processing unit 219 may further include a sound algorithm module 209. The sound algorithm module 209 may be configured to process the sound provided by the microphones 201 or 202 (or, more specifically, received after processing by the anti-hauling module 208), to reduce noise, enhance voice, etc. Specifically, the sound algorithm module 209 may process the sound in accordance with, for example, control parameters 212 (explained in further detail below).

The sound processing unit 219 may further include an equalizer 210. The equalizer 210 may assist with compensation for hearing loss by highlighting one or more frequencies for amplification or attenuation. In some embodiments, the equalizer 210 may serve as volume control. The equalizer 210 may operate in accordance with the control parameters 212.

The sound processing unit 219 may further include a synthesis and automatic gain control (AGC) module 211.

The AGC module 211 may convert the signal from the frequency domain to the time domain. The time domain signal may then be output to the speakers 216 or 217 for playback. In some embodiments, the AGC module 211 may further output the signal to a processor 213 for further processing, storage, transmission to mobile phone, transmission to the server, etc.

The sound processing unit 219 may further include a storage which may store control parameters 212. The storage may be, for example, a volatile memory, a NVM, or some other type of memory. For example, the storage may be a flash card, static random-access memory (SRAM), a DDR, etc. The control parameters may be used to control or otherwise provide information to various modules such as the beamforming module 203, the sound algorithm module 209, the anti-hauling modules 206 and 208, the equalizer 210, the synthesis and AGC module 211, or some other module.

The control parameters 212 may be communicatively coupled with, and controlled by, the processor 213. In some embodiments, the processor 213 may provide information or parameters to the control parameters 212 which may then be used during operation of the wearable audio device. In some embodiments, the parameters may be considered "fixed" while in other embodiments the parameters may be dynamically updated by the processor 213 based on changing conditions or factors of the wearable audio device (e.g., information provided by various sensors of the wearable audio device, information received from the neural network, etc.). In some embodiments, although the processor 213 is only depicted as directly coupled with the control parameters 212 of the sound processing unit 219, in other embodiments the processor 213 may be directly communicatively coupled with one or more other modules of the sound processing unit 219.

The sound processing unit 219 may further include a feedback management module 218. In some embodiments, the feedback management module 218 may be desirable to compensate for or negate the microphones 201 or 202 picking up a user's own voice. Generally, it may be uncomfortable for an individual to hear their own voice, and so the feedback management module 218 may remove that sound from the audio stream as it progressing through the wearable audio device. It will be noted, however, that in some embodiments the feedback management module 218 may not be present. An example embodiment may be where the wearable audio device is designed such that the microphones may be directed to not pick up a user's voice, or a passive feedback removal technique such as occlusion venting may be used. Other variations may be present in other embodiments.

The wearable audio device may further include a battery/power-management module 204. The battery/power-management module 204 may be or include a power source such as a single battery (e.g., a lithium-ion battery or some other type of battery), or it may include one or more supporting circuitry elements such as voltage regulators, a battery gauge, a battery charging system, etc.

The wearable audio device may include one or more user-accessible buttons 205. The buttons 205 may be, for example, located on the side of the wearable audio device. The buttons 205 may be used by a user to change modes of the wearable audio device, provide feedback, etc. The feedback from the buttons 205 may be part of the user-provided feedback that is transmitted to the server 104 as described above.

The wearable audio device may further include one or more transceiver modules 214 coupled with one or more antennas 221. The transceiver modules 214 may include, for example, separate transmit or receive modules (not shown) that are configured to transmit or receive one or more wireless signals as discussed herein. In other embodiments, the transceiver module 214 may be a unitary module configured to both transmit and receive wireless signals. The antenna(s) 221 may be physical elements configured to transmit or receive the wireless signals over the air. The wearable audio device may further include a subscriber identity module (SIM) module 222 which may be communicatively coupled either directly or indirectly with the transceiver module 214. The SIM module 222 may be, for example, an embedded SIM (eSIM), an integrated SIM (iSIM), or some other type of module that allows for, facilitates, or otherwise supports wireless communication.

The wearable audio device may further include a sound level indicator 215. The sound level indicator 215 may be configured to display a level of sound pressure (e.g., a sound level as measured in decibels (dB)) in the environment. In some embodiments, the sound level indicator 215 may be configured to display this information based on a current level or a level with a given time period such as a day, a week, a month, etc. The sound level indicator 215 may be, for example, a light-emitting diode (LED), a multi-color LED, a graphical display, a voice message, an audio signal, etc. In some embodiments, the sound level indicator 215 may also act as an air quality indicator as described herein. For example, the air quality indicator may similar display information related to current air quality or air quality over a given time period.

The wearable audio device may further include one or more sensors 220 which may be, for example, one or more of the sensors discussed above such as a gyroscope, a magnetometer, an air quality sensor, etc.

It will be understood that while various elements and, particularly, various modules of the sound processing unit 219 are depicted as separate modules, in some embodiments certain elements or modules may be elements of a single physical structure. For example, the various modules may be implemented as software on a single processor, as separate processing chips, as firmware, or as some combination thereof.

The following Figures relate to training of, and the use of, the neural network (e.g., neural network 107). As noted, the neural network may be based on a variety of parameters and weights. It may be desirable to train the neural network to initially identify, or continuously update, the weights. The weights may then be used to predict or otherwise provide control parameters such as control parameters 212 for use by the wearable audio device.

Generally, it will be understood that although a weight or weights are used in this discussion, in some embodiments the training of the weights or use of the weights may relate to a singular weight or a set of weights. Additionally, it will be understood that various functions related to use of the weights may include the use of a technique such as a bias, a transfer function, etc. The specific mathematic algorithm which may be used to perform one or more calculations related to the weights may not be discussed in significant detail herein, as such an algorithm may be related to a specific use case or configuration of the wearable audio device.

Figure 3:
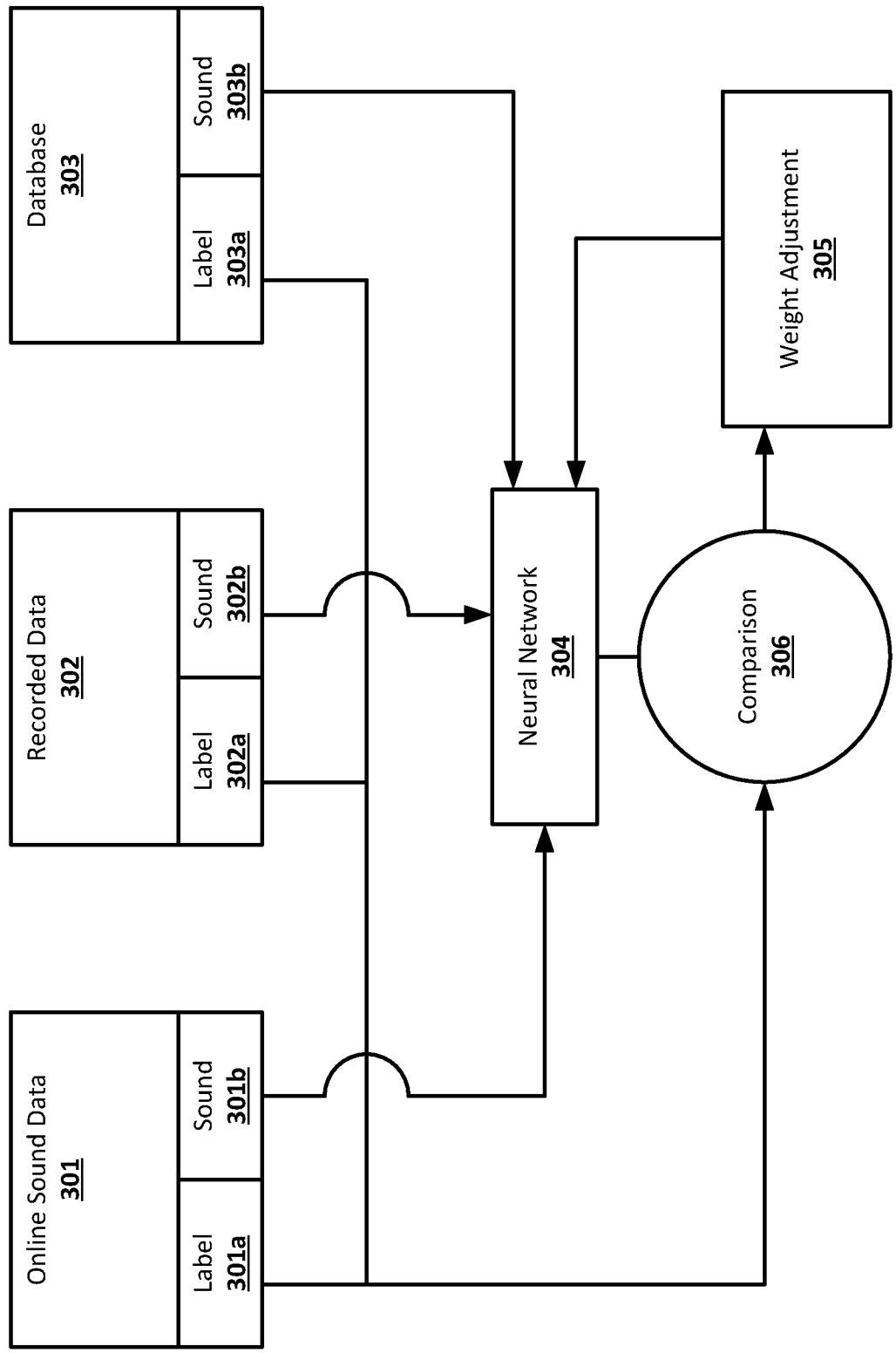
FIG. 3 depicts an example technique for training of sound-environment classification, in accordance with various embodiments.

One such group of weights which may be used may include sound-environment classification. FIG. 3 depicts an example technique for training of sound-environment classification, in accordance with various embodiments. In various embodiments, the technique of FIG. 3 may be performed by a server such as server 104, whereas in other embodiments the technique may be performed at least partially by one or more other elements of the system architecture as described herein.

The technique may include identifying a plurality of data sources such as online sound data 301, recorded data 302, or data from the database 303. It will be understood that these data sources are examples and other embodiments may include different types of, or different sources of, data. The online sound data 301 may be sound clips or sound data drawn from publicly available websites or other sources. The recorded data 302 may be data that is recorded in a variety of places to include different sounds, environments, etc. The database may be similar to, for example, database 105 and may include data that has already been analyzed or processed by the neural network 107. Each of the data sources may include information such as the sound itself 301b/302b/303b as well as a label for the data 301a/302a/303a. The label may identify how the sound should be categorized. The labels may include one or more entries or pieces of information or classifications (e.g., "male voice," "coffeeshop," "background music," etc.)

The sounds 301b/302b/303b may be provided to the neural network 304 where they may be processed or analyzed. Specifically, the neural network 304 may be similar to, for example, neural network 107. The sounds may be processed by the neural network 304 through application of one or more weights to the sound data to identify the various sound environments from which the sounds originated. The output of the neural network analysis may then be compared to the pre-identified labels 301a/302a/303a for the respective sounds 301b/302b/303b at 306. The output of the comparison 306 may provide an error measurement (e.g., a degree to which the neural network 304 mis-classifies a sound). If the error measurement is above a specific threshold (e.g., more than 5% error or some other threshold), then the weights may be adjusted at 305 and the neural network 304 may run again to classify the same or different sounds. Once the error measurement is below the pre-identified threshold, then the weights may be stored in a database such as database 105, output to a wearable audio device, or otherwise stored for later use by the system.

It will be understood that although three data sources are identified in FIG. 3, other embodiments may include more or fewer data sources. Additionally, it will be understood that in some embodiments the data may be split into distinct sets for machine-learning such as a test set, a validation set, and a training set. It will also be understood that although the training above is described only with respect to "sound," in various embodiments additional data may be taken into account during the training process such as the additional data described above which may be appended by a mobile device. An example of such additional data may include geo-location data, timestamps, etc. which may be used to further label or otherwise classify the audio data. In other words, if a sound file occurs at a similar geo-location and timestamp as a known sound file, it may be a reasonable assumption that the sound file includes similar noise characteristics as the known sound file. Other variations may be present in other embodiments.

Figure 4:
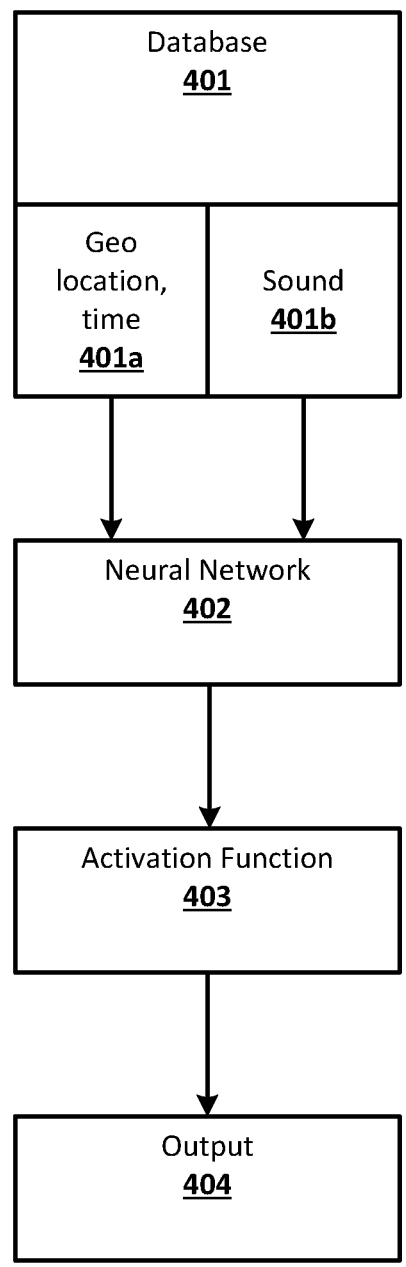
FIG. 4 depicts an example technique for predicting a sound environment in which a wearable audio device may be located, in accordance with various embodiments.

FIG. 4 depicts an example technique for predicting a sound environment in which a wearable audio device may be located, in accordance with various embodiments. Specifically, FIG. 4 depicts an example technique which may be used by a neural network such as neural network 107 to predict a sound environment in which the wearable audio device may be located based on the weights identified in FIG. 3.

The technique may include identifying, in a database 401 (which may be similar to database 105 or some other database), audio data. The audio data may be recorded by a wearable audio device such as that depicted in FIG. 2 and uploaded to the database. The audio data may include, for example, a sound file 401b which may be recorded sound of the location in which the wearable audio device is located. The audio data may further include information such as a timestamp, geo-location data, or some other data which may be appended to the audio data by a device such as a mobile device when the audio data is transmitted to the database as described above.

The audio data identified at 401 may be provided to a neural network 402, which may be similar to neural networks 107 or 304. The neural network at 402 may process the audio data using the weights identified at 305. Specifically, the neural network may apply one or more of the identified weights based on elements such as a recorded sound file of, or related to, the audio data, geo-location data of the audio data, a timestamp of the audio data, etc. The application of the weights, as noted above, may include application of a bias, a transfer function, etc.

The results of the processes of the neural network 402 may then be output to an activation function 403. The activation function 403 may be, for example, the selection of one of a number of possible output states of the neural network. More specifically, the activation function 403 may output one or more predicted classification results of the audio file identified in the database at 401. As an example, the activation function may predict that the audio file is in an "airplane" type environment where a "male voice" is speaking, or some other parameter or combination of parameters.

The sound environment prediction may then be output at 404. In some embodiments, the sound environment prediction may be output at 404 for further processing, e.g., to identify one or more parameters to be used by a wearable audio device during generation or playback of an audio signal as will be described in greater detail below. In some embodiments, the sound environment prediction may additionally or alternatively be output to a database such as database 105 for further storage. Other embodiments may include additional or alternative destinations for output of the sound environment prediction at 404.

Figure 5:
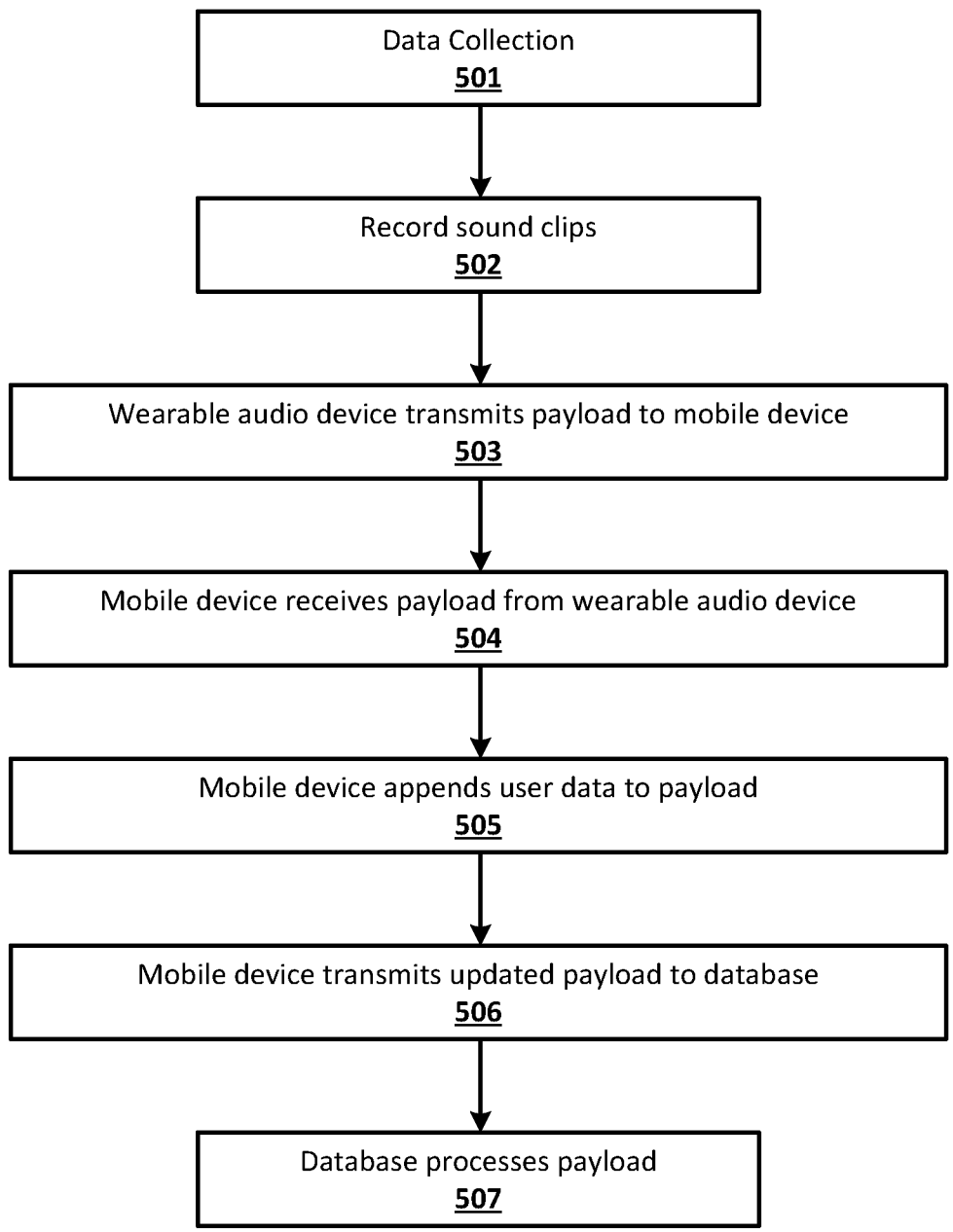
FIG. 5 depicts an example technique for data collection by a wearable audio device, in accordance with various embodiments.

FIG. 5 depicts an example technique for data collection by a wearable audio device, in accordance with various embodiments. For example, FIG. 5 may depict an example of how data may be collected by the wearable audio device for provision of the technique of FIG. 4, or some other technique herein.

Initially, a wearable audio device (e.g., such as wearable audio devices 101a-101n, the wearable audio device depicted in FIG. 2, or some other wearable audio device) may identify that data collection is to be performed at 501. Such an identification may be based on an identified change in one or more parameters of a sensor (e.g., sensor(s) 220), a request from a server such as server 104, a time parameter (e.g., data collection is to be performed in accordance with specific time intervals, movements) or some other parameter.

The wearable audio device may then record one or more sound clips at 502. The sound clips may be recorded using, for example, microphones 201 or 202. The sound clips may be recorded in mono, in stereo, as raw microphone signals, or in some other format. The sound clips may be digitized, compressed, or otherwise encoded to a data payload which may then be transmitted to a mobile device such as mobile devices 103a-103n. The transmission may be accomplished using, for example, transceiver 214 and antenna 221. Such a transmission may be accomplished in accordance with a short-range wireless protocol such as WIFI or Bluetooth®, a cellular protocol, a wired protocol, or some other protocol.

The mobile device may receive the data payload from the wearable audio device at 504 and append user data to the payload at 505 to generate an updated payload. As noted above, the user data may include elements such as user inputs done by an application, user-related data, geo-location or timestamp data, an identifier, or some other user-related data.

The mobile device may then transmit the updated payload to the database at 506. Such a transmission may be in accordance with, for example, a cellular protocol or some other wireless or wired protocol. The database may be, for example, database 105 of FIG. 1.

The database may then process the payload at 507. Specifically, the database may store the payload, or may provide it for additional processing by a neural network such as neural network 107. Such additional processing may include, for example, prediction of one or more parameters as described in FIG. 4 or some other Figure herein, or sound environment classification as described further with respect to FIG. 6.

Figure 6:
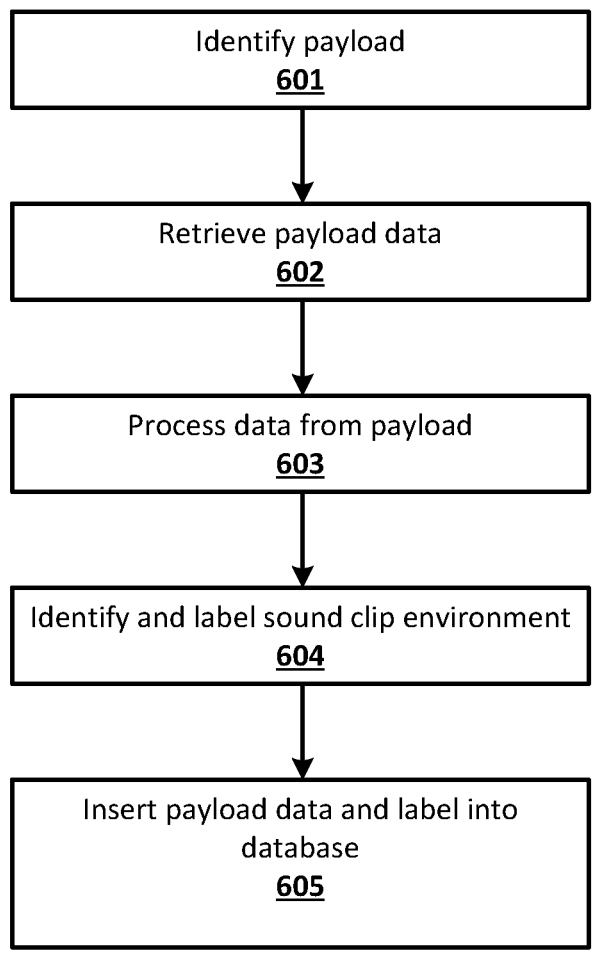
FIG. 6 depicts an example technique for sound environment classification, in accordance with various embodiments.

FIG. 6 depicts an example technique for sound environment classification, in accordance with various embodiments. Specifically, FIG. 6 may depict an example technique which may be used to classify and append additional payloads to a database such as database 105. The payload may be similar to that generated in FIG. 5, as described above. More specifically, FIG. 6 may be seen as being the same as, part of, including, or being a subset of element 507 of FIG. 5.

As noted, the neural network may use various sound clips for tasks such as training, prediction, or identification of "sound maps" to identify particularly noisy areas of a given environment, consistently noisy environments, urban planning, traffic routing, etc. Generally, the technique may be performed by elements of a server such as server 104 or, more specifically, a neural network such as neural network 107 on the server. However, in other embodiments one or more elements of the technique may be performed on other elements of the system architecture such as a processor of a mobile device, a wearable audio device, some element of a neural network running on one of the other elements of the system architecture, etc.

The technique may include identifying, at 601, a payload that is to be processed. The payload may be or include, for example, audio data that is recorded by a microphone of a wearable audio device such as microphones 201 or 202. The payload may further include additional data such as user application settings or feedback, geo-location data, timestamp data, or some other type of data as described above with respect to FIG. 5 and, more particularly, with respect to element 505 of FIG. 5. The various data may be retrieved from the payload at 602 for further processing. Specifically, the sound data may be identified, elements such as geo-location data or timestamp data may be identified, etc.

The payload data may then be processed by the neural network at 603. Specifically, the payload data may be processed as described with respect to FIG. 4. The various data elements (e.g., the sound elements, the additional information such as geo-location or timestamp, etc.) may be processed by the neural network using weights such as those identified at, e.g., 304 or 305. The processing may be in accordance with, for example, elements 402 or 403 of FIG. 4. Based on the processing, a sound clip environment may be identified at 604. Specifically, the sound clip environment may be identified at 604 as described with respect to elements 402 or 403 of FIG. 4. As an example, it may be identified based on factors such as the audio data, the timestamp, the geo-location, user feedback, or other data that the wearable audio device that generated the payload (or parts thereof) is in a "cafe" where there is a "male voice" and "background music" or some other similar details. The terms "cafe," "male voice," or "background music" may be considered labels for the specific payload data, as described above. The payload data and associated labels may then be stored in a database such as database 105 as described above. The storage of the payload data and labels may be similar to element 404, described above.

Figure 7:
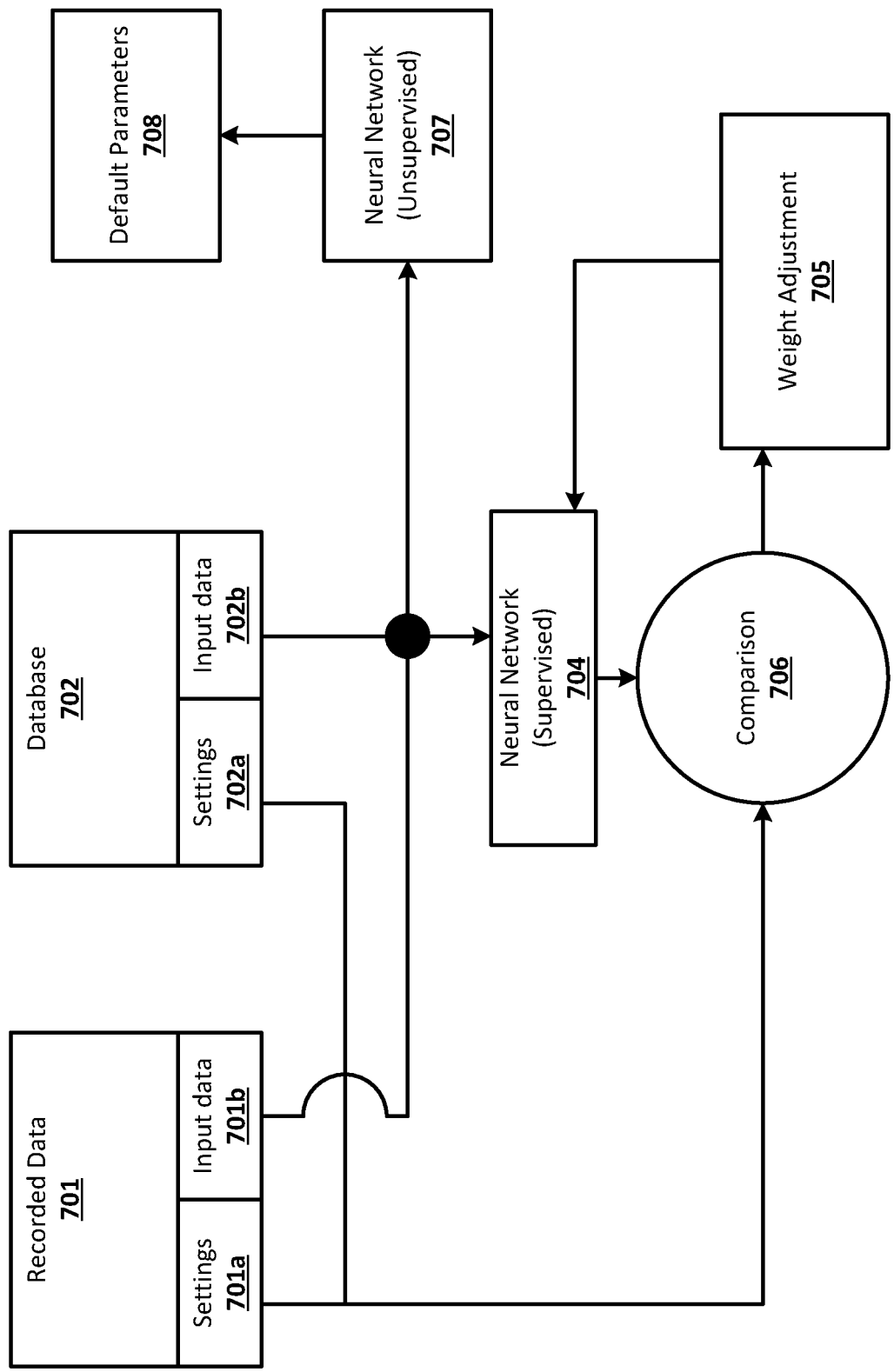
FIG. 7 depicts an example technique for training of parameter setting prediction, in accordance with various embodiments.

FIG. 7 depicts an example technique for training of parameter setting prediction, in accordance with various embodiments. Generally, elements of FIG. 7 may be similar to, and share characteristics with, elements of FIG. 3.

In various embodiments, the technique of FIG. 7 may be performed by a server such as server 104, whereas in other embodiments the technique may be performed at least partially by one or more other elements of the system architecture as described herein.

The technique may include identifying recorded data at 701 and data in a database at 702. The recorded data at 701 may be similar to recorded data 302, and the data in the database at 702 may be similar to the data in the database at 303. Specifically, the recorded data at 701 may be data that is recorded for the sake of increasing the sample size of data in the database. The data in the database may be data that had already been stored in the database as, for example, a result of a technique such as those of FIG. 4 or 6, or some other technique.

The recorded data 701 and the data in the database 702 may have parameter settings 701a and 702a. The parameter settings may identify one or more parameters to be used by a wearable audio device during sound generation or playback. Such parameters may include, for example, a beamformer parameter, an equalizer setting, a noise cancellation setting, a noise reduction setting, or a control parameter, or some other parameter. Such parameters may be similar to, for example, the control parameters described above with respect to element 212. Generally, the parameter settings 701a/702a may relate to parameter settings that were previously used in a given environment, parameter settings that were manually entered for the purpose of training, or some other parameter settings.

The parameter settings 701a/702a may be matched with respective input data 701b/702b. The input data 701b/702b may be data such as audio clips, audio characteristics, geo-location data, timestamp data, user application data, etc. as described above. In some embodiments, the input data 701b/702b may include a sound environment classification such as that output by Figures described above such as FIG. 3 or 4. Similarly to the data described above with respect to FIG. 3, the recorded data 701 or the data in the database 702 may be split into separate sections such as "test," "validation," and "training" datasets.

The input data 701b and 702b may be provided to two aspects of a neural network (such as neural network 107). The two aspects are referred to herein as a "supervised" neural network 704 and the "unsupervised" neural network 707. The supervised neural network 704 may relate to processing of the data to identify weights which may be used for identification of a parameter setting for the algorithm running on the wearable audio device. Generally, the weights may be identified by the supervised neural network 704, a comparison at 706, and then weight adjustment at 705 in a manner similar to that described above with respect to neural network 304, comparison 306, and weight adjustment 305. Specifically, the input data 701b and 702b may be input to the supervised neural network 704, which may process the data to identify parameter settings such as those described above with respect to elements 701a and 702a. The settings 701a and 702a may then be compared at 706 with the output of the supervised neural network 704. If the pre-identified settings 701a/702a differ from the output of the supervised neural network 704 to a degree above an error threshold (e.g., by more than approximately 5% or some other value), then the weights used by the supervised neural network 704 may be adjusted at 705, and the supervised neural network 704 may run again on the same or different input data 701b/702b. This comparison cycle may continue until the degree of error is below the pre-identified error threshold.

The input data 701b and 702b may also be provided to the unsupervised neural network 707. The unsupervised neural network 707 may not necessarily use the same weights, or may not have the same feedback cycle, as the supervised neural network 704. Rather, the unsupervised neural network 707 may generate a set of default parameters 708 which may be used in situations where the supervised neural network 704 may not have enough input data to generate the appropriate parameters. The resultant weights identified at 705 or parameters identified at 704 or 707 may then be output in the form of storage in a database, provision to a wearable audio device, or some other type of output.

Figure 8:
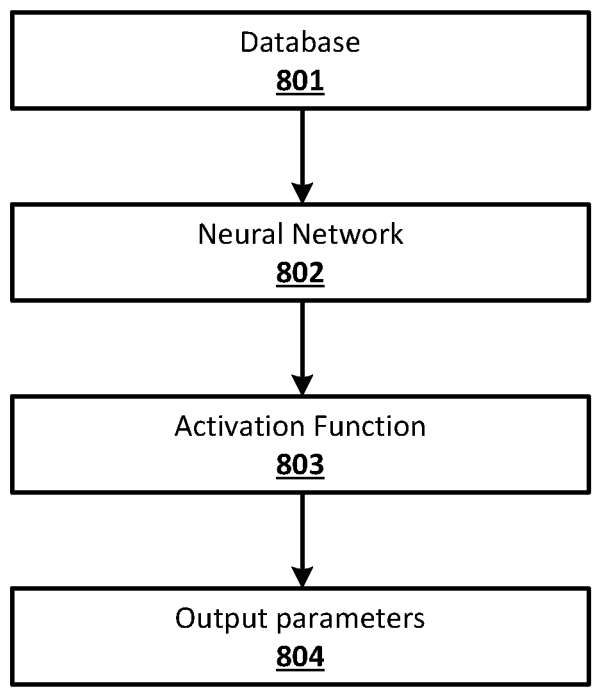
FIG. 8 depicts an example technique for prediction of a parameter setting, in accordance with various embodiments.

FIG. 8 depicts an example technique for prediction of a parameter setting, in accordance with various embodiments. Specifically, FIG. 8 depicts an example technique which may be used by a wearable audio device (e.g., that of FIG. 2) to identify one or more control parameters (e.g. beamforming parameters, equalizer settings, etc.) to be used during audio playback or audio signal generation by the wearable audio device. Generally, the technique may include elements similar to those of FIG. 4.

The technique may include identifying, in a database 801 (which may be similar to database 105 or some other database), input data which may be similar to, for example, input data 701b or 702b. The input data may include audio data recorded by a wearable audio device such as that depicted in FIG. 2 and uploaded to the database. The audio data may include, for example, a sound file which may be recorded sound of the location in which the wearable audio device is located. The audio data may further include information such as a timestamp, geo-location data, sound environment classification data, or some other data which may be appended to the audio data by a device such as a mobile device when a payload is transmitted to the database as described above.

The input data identified at 801 may be provided to a neural network 802, which may be similar to neural networks 107, 304, 402, etc. The neural network at 802 may process the audio data using the weights identified at 704 and 705. Specifically, the neural network may apply one or more of the identified weights based on elements such as a recorded sound file of, or related to, the audio data, geo-location data of the audio data, a timestamp of the audio data, etc. The application of the weights, as noted above, may include application of a bias, a transfer function, etc.

The results of the processes of the neural network 802 may then be output to an activation function 803. The activation function 803 may be, for example, the selection of one of a number of possible output states of the neural network. More specifically, the activation function 803 may identify one or more parameter settings such as those described above with respect to parameter settings 701a or 702a based on the application of the weights at 802 to the data identified at 801.

The parameters may then be output at 804. In some embodiments, the parameters may be output at 804 to a wearable audio device for use in sound generation or playback. For example, the parameters may be stored in the control parameters 212 of the wearable audio device of FIG. 2. In some embodiments, the parameters may additionally or alternatively be output to a database such as database 105 for further storage. Other embodiments may include additional or alternative destinations for output of the parameters at 804.

Figure 9:
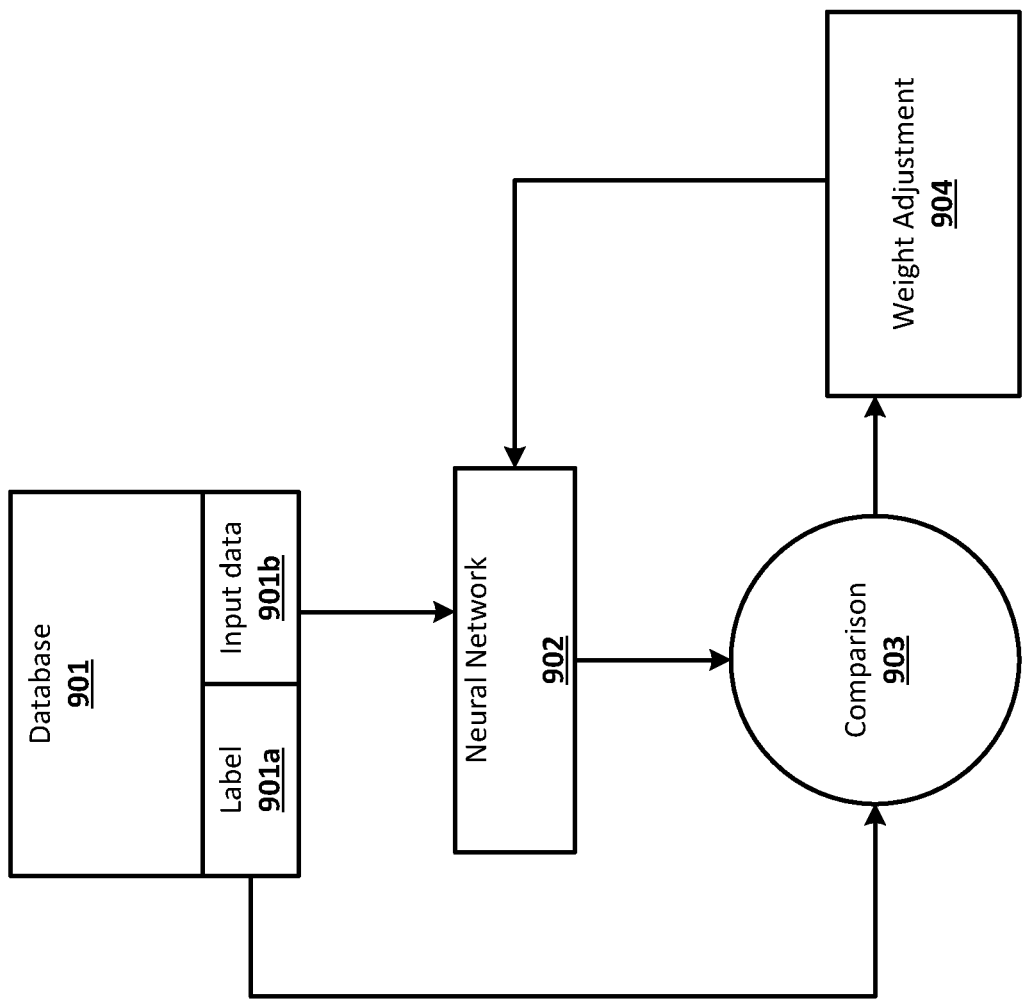
FIG. 9 depicts an example technique for training of sound level prediction, in accordance with various embodiments.

FIG. 9 depicts an example technique for training of sound level prediction, in accordance with various embodiments. As noted, a prediction of sound level may be useful in a variety of circumstances such as selection of a parameter for a wearable audio device (equalization, volume control, etc.) or for use in routing or identification of particularly noisy areas. The technique may be generally similar to, and share one or more characteristics with, the technique of FIG. 3. In various embodiments, the technique of FIG. 9 may be performed by a server such as server 104, whereas in other embodiments the technique may be performed at least partially by one or more other elements of the system architecture as described herein.

The technique may include identifying data in a database at 901. The data may be similar to the data in the database at 303. Specifically, the data in the database may be data that had already been stored in the database as, for example, a result of a technique such as those of FIG. 4 or 6, or some other technique.

The data in the database 901 may include input data 901b and one or more labels 901a associated with the input data 901b. The labels at 901a may be labels related to the sound level such as a relative noise level, a categorization, an objective noise level (x dB), or some other type of label. The input data 901b may be data such as audio clips, audio characteristics, geo-location data, timestamp data, user application data, etc. as described above. In some embodiments, the input data 901b may include a sound environment classification such as that output by Figures described above such as FIG. 3 or 4. Similarly to the data described above with respect to FIG. 3, the data in the database 901 may be split into separate sections such as "test," "validation," and "training" datasets.

The input data 901b may be provided to a neural network 902 which may be, for example, similar to neural network 107 or 304. The neural network 902 may process the provided data to identify weights which may be used for identification of a predicted sound level. Generally, the weights may be identified by the neural network 902, a comparison at 903, and then weight adjustment at 904 in a manner similar to that describe above with respect to neural network 304, comparison 306, and weight adjustment 305. Specifically, the input data 901b may be input to the neural network 902, which may process the data to identify information related to a predicted sound environment such as the information or labels described with respect to label 901a. The predicted label may then be compared at 903 with the output of the pre-identified labels 901a. If the pre-identified labels 901a differ from the output of the neural network 902 to a degree above an error threshold (e.g., by more than approximately 5% or some other value), then the weights used by the neural network 902 may be adjusted at 904, and the neural network 902 may run again on the same or different input data 901*b*. This comparison cycle may continue until the degree of error is below the pre-identified error threshold.

Figure 10:
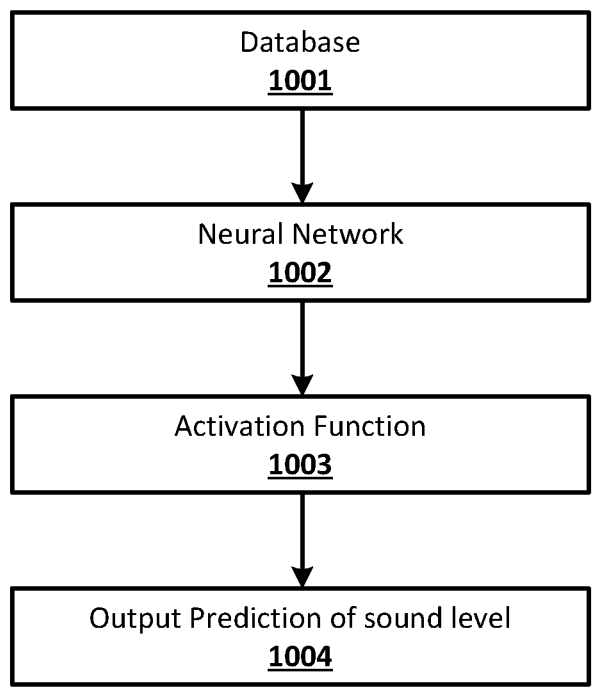
FIG. 10 depicts an example technique for prediction of sound level, in accordance with various embodiments.

FIG. 10 depicts an example technique for prediction of a sound level, in accordance with various embodiments. Specifically, FIG. 10 depicts an example technique which may be used by a wearable audio device (e.g., that of FIG. 2) a server (e.g., server 104 of FIG. 1), or some other electronic device to identify a predicted sound level of a given environment. Generally, the technique may include elements similar to those of FIG. 4.

The technique may include identifying, in a database 1001 (which may be similar to database 105 or some other database), input data (which may be similar to, for example, input data 901*b* of FIG. 9), etc. The input data may include audio data such as that recorded by a wearable audio device such as that depicted in FIG. 2 and uploaded to the database. The input data may further include information such as a timestamp, geo-location data, sound environment classification data, or some other data which may be appended to the audio data by a device such as a mobile device when a payload is transmitted to the database as described above.

The input data identified at 1001 may be provided to a neural network 1002, which may be similar to neural networks 107, 304, 902, etc. The neural network at 1002 may process the audio data using the weights identified at 902 and 904. Specifically, the neural network may apply one or more of the identified weights based on elements such as a recorded sound file of, or related to, the audio data, geo-location data of the audio data, a timestamp of the audio data, etc. The application of the weights, as noted above, may include application of a bias, a transfer function, etc.

The results of the processes of the neural network 1002 may then be output to an activation function 1003. The activation function 1003 may be, for example, the selection of one of a number of possible output states of the neural network. More specifically, the activation function 1003 may identify one or more label settings related to the sound level such as those described above with respect to element 901*a*.

The parameters may then be output at 1004. In some embodiments, the parameters may be output at 1004 to a wearable audio device for use in sound generation or playback. For example, the parameters could be output to the control parameters 212. In some embodiments, the parameters may additionally or alternatively be output to a database such as database 105 for further storage. Other embodiments may include additional or alternative destinations for output of the parameters at 1004.

It will be understood that the above depictions and descriptions are intended as highly simplified examples of training or processing techniques which may be used by one or more elements of the system architecture. Other embodiments may include more or fewer elements (e.g., additional sources of training data, additional processing elements, fewer sources of training data or processing elements, etc.) In some embodiments, certain elements may be combined, or an element depicted as a unitary element may be formed of a plurality of elements with distinct functionality. In some embodiments, certain of the techniques or elements may be distributed across a number of physical structures (e.g., a database and a wearable audio device, multiple elements of a wearable audio device, etc.). Although only distinct data sources are shown in certain Figures, some of the Figures (e.g., FIG. 3) may use less sources or different sources than depicted, and some of the Figures (e.g., FIG. 9) may use more sources than depicted.

Figure 11:
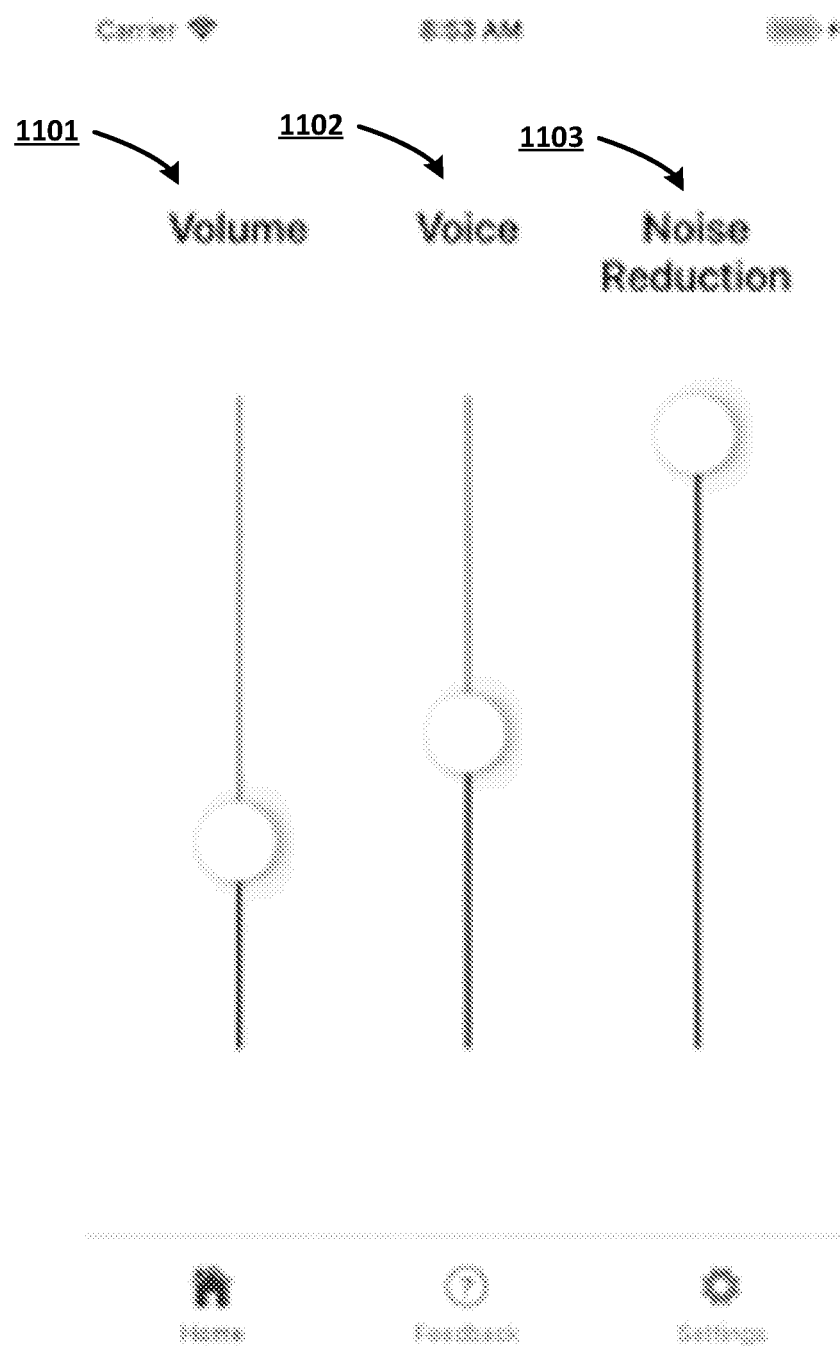
FIG. 11 depicts an example graphical user interface (GUI) by which a user may provide feedback, in accordance with various embodiments.

FIG. 11 depicts an example GUI by which a user may provide feedback, in accordance with various embodiments. Specifically, as has been previously noted, a mobile device such as mobile devices 103*a*-103*n* may be configured to run an application related to the wearable audio device by which a user may provide feedback. The feedback may take the form of altering the sound processing of the wearable audio device and provide information which may be used for sound environment classification (e.g., at FIG. 4), parameter selection (e.g., at FIG. 6), or in some other manner. It will be understood that the GUI of FIG. 11 is intended as a highly simplified example, and other examples or embodiments may have more or fewer elements than those depicted in FIG. 11.

The GUI may include a volume control 1101. The volume control may provide an indication by the user of whether it is desired to raise or lower the overall volume of the sound generated by the wearable audio device.

The GUI may further include a voice control 1102. The voice control may provide an indication of whether the user desires to raise or lower the volume of audio related to voice. The voice may be, for example, the voice of an individual to whom the user is speaking, an individual addressing a room in a noisy environment (e.g., giving a lecture or a toast), or some other voice. As a result of changing this setting, the wearable audio device may alter the volume of audio that is identified or classified as "voice," "male voice," "female voice," or some other appropriate label at FIG. 3 or 4, or some other Figure or technique herein.

The GUI may further include a "noise reduction control" 1103. The noise reduction control 1103 may raise or lower the volume of other sounds in a given environment. In some embodiments, the noise reduction control 1103 may alter the volume of any sounds that are not associated with the voice control 1102 In other embodiments, the noise reduction control 1103 may alter the volume of sounds that are pre-identified (e.g., by a user setting or some other pre-identification technique) as "noise." Such sounds may be, for example, background hum on an airplane, a baby crying, a dog barking, etc. Similarly to the voice control 1102, the noise reduction control 1103 may alter the sounds based on labels identified at FIG. 3 or 4, or some other Figure or technique herein.

Figure 12:
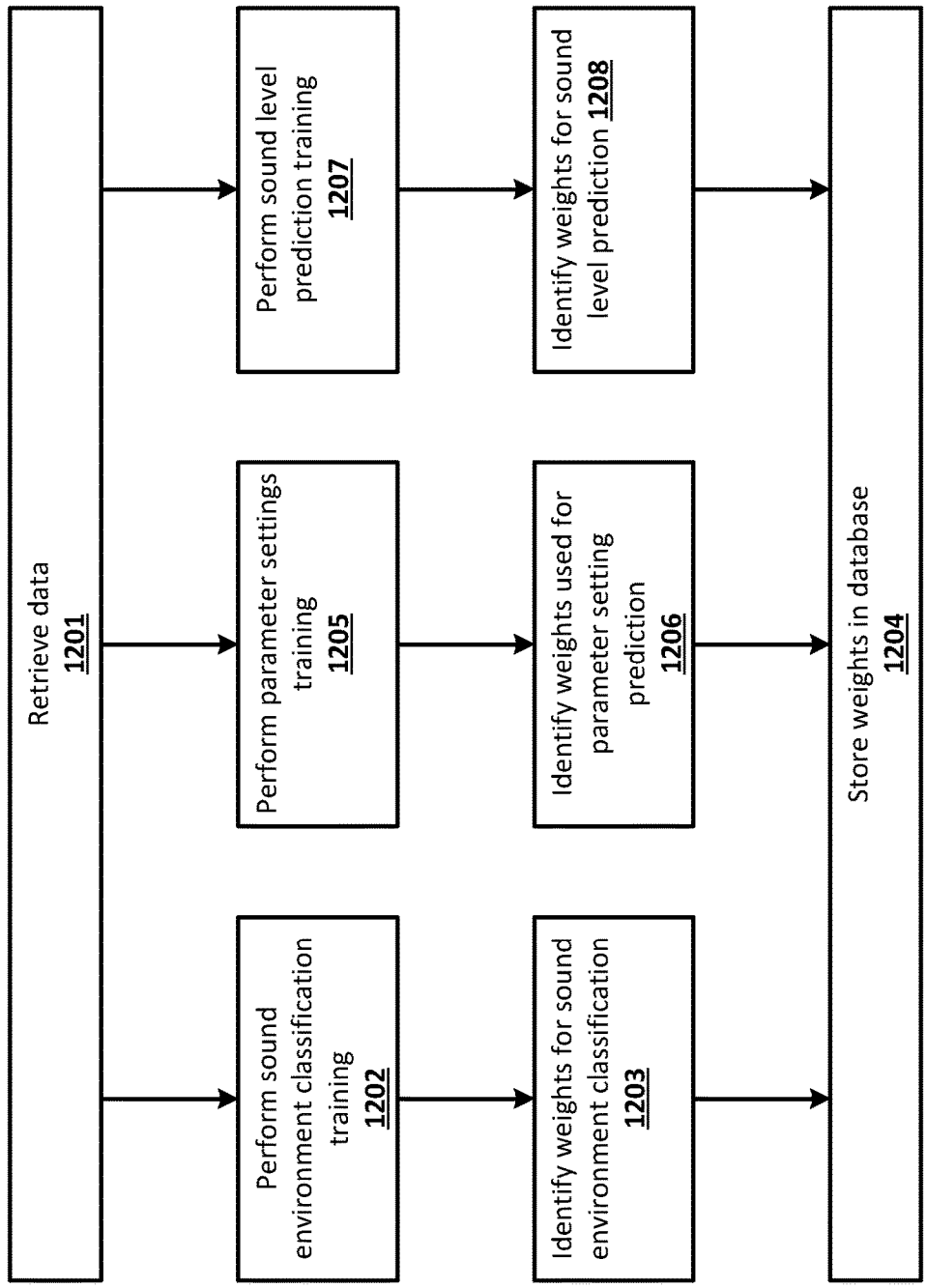
FIG. 12 depicts an example overview of training of the neural network, in accordance with various embodiments.

FIG. 12 depicts an example overview of training of the neural network, in accordance with various embodiments. Generally, FIG. 12 is intended as a summarization and contextualization of other Figures discussed herein.

The technique may include retrieving data at 1201. The data may be, for example, online sound data 301, recorded data 302 or 701, data from the database 303/702/901, etc. That data may further include the data elements such as the various labels, input data, audio data, parameters, etc. described with respect to FIG. 3, 7, or 9.

The technique may further include performing sound environment classification training at 1202 (e.g., the technique of FIG. 3), parameter settings training at 1205 (e.g., the technique of FIG. 7), or sound level prediction training at 1207 (e.g., the technique of FIG. 9). The trainings may respectively result in the identification of weights for sound environment classification at 1203 (e.g., the weights identified at 305), the identification of weights used for parameter setting prediction at 1206 (e.g., the weights identified at 705), or the identification of weights for sound level prediction at 1208 (e.g., the weights identified at 904). The weights may be stored in the database at 1204. For example, the weights may be stored for provision to the wearable audio device, or the control parameters 212 thereof, as described above.

It will be understood that although the techniques of FIG. 12 are depicted as concurrent, in some embodiments certain of the techniques may be sequential, or not performed at all. For example, the weights identified at 1203 may be a portion of the data used for the training at 1205. Other variations may be present in other embodiments.

Figure 13:
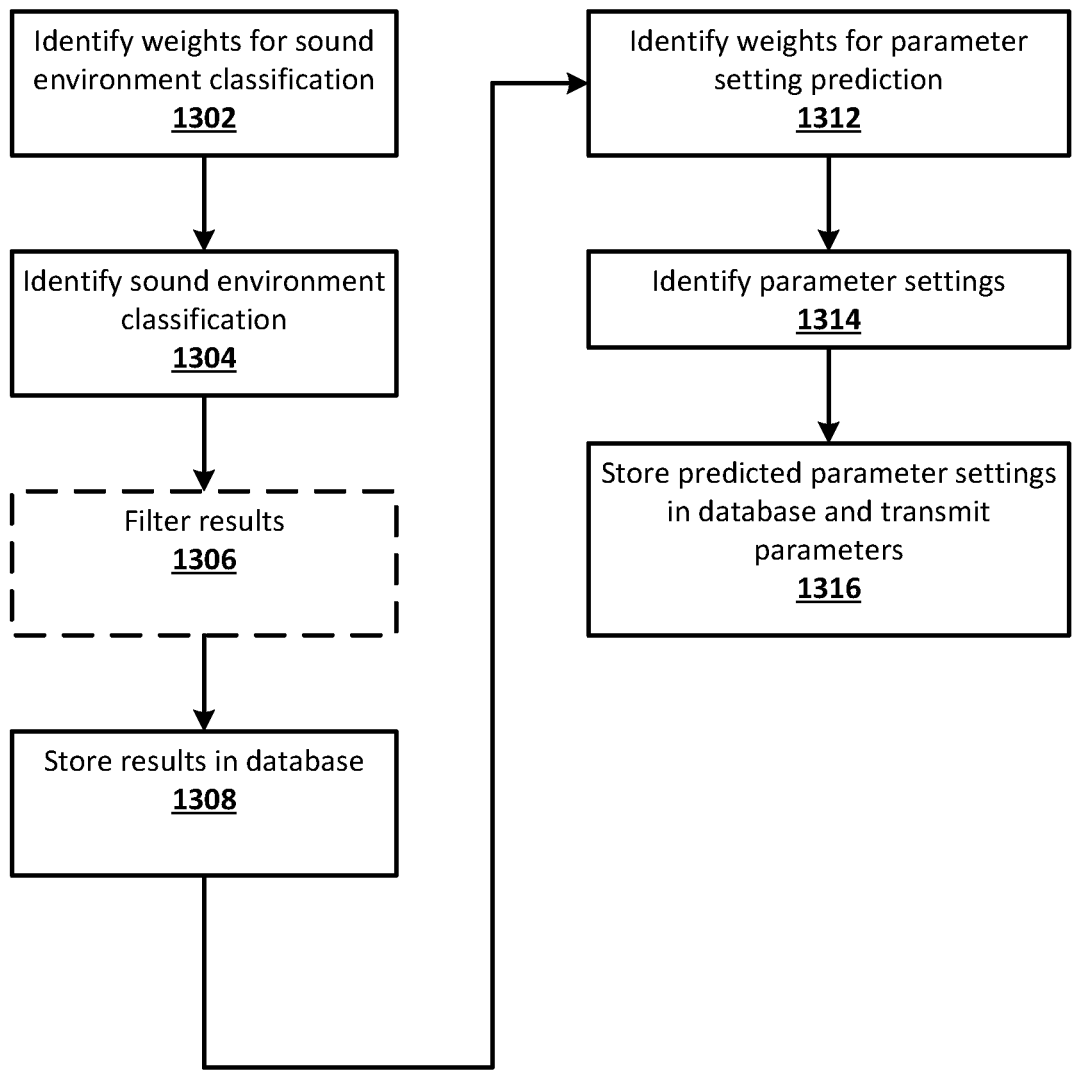
FIG. 13 depicts an example technique for use of the neural network, in accordance with various embodiments.

As has been previously noted, various of the weights may be identified for the purpose of identifying one or more parameters for use by a wearable audio device (e.g., the wearable audio device of FIG. 2) for generation or playback of an audio signal. Various of the training techniques and identification of the parameters have been described above. FIG. 13 depicts an example technique for use of the neural network, in accordance with various embodiments. Generally, the technique may be performed by a neural network such as neural network 107, and one or more portions of the technique may be performed on a server such as server 104 or on portions of the neural network distributed across multiple physical elements of the system architecture.

The technique may include identifying, at 1302, one or more weights for sound environment classification. The weights may be similar to the weights identified at, for example, 305.

The technique may further include identifying, at 1304, a sound environment classification for a given environment. The identification may be as described at, for example, FIG. 4. Specifically, the identification may be for an environment in which a wearable audio device may be located, and may be based on data provided at, for example, FIG. 5 or 6. The identification may be based on the weights identified at 1302.

The technique may optionally further include filtering, at 1306, the results identified at 1304. The filtering at 1306 may be for the purpose of removing results that appear to be aberrations from the identifications at 1304. As an example, the identification may be performed a plurality of times on different data from the wearable audio device (e.g., sound clips recorded a few seconds apart) to ensure a consistent sound environment identification. An example might be if the identification provides 4 consistent results and 1 inconsistent result, then the filtering may remove the inconsistent result to increase the accuracy of the identification results. Other filters that might be applied are low-pass filter, high-pass filter, median filter, etc.

The results of the sound environment classification may then be stored in the database at 1308. The database may be similar to, for example, database 105 or some other database.

The technique may further include identifying, at 1312, one or more weights for parameter setting identification. The weights may be similar to, for example, the weights identified at 705 or some other weights.

The weights identified at 1312 may be used to identify one or more parameter settings at 1314. The parameters may be one or more of the parameters discussed above such as beamforming parameters, equalizer settings, etc. The identification of the parameter settings at 1314 may be based on, for example, the sound environment identified at 1304. More generally, the identification of the parameter settings may be similar to the identification described with respect to FIG. 8.

The parameter settings may then be stored in a database (e.g., database 105) and transmitted to the wearable audio device for use in generation or playback of a sound at 1316. For example, the identified parameter settings may be stored in the control parameters 212 of the wearable audio device.

Figure 14:
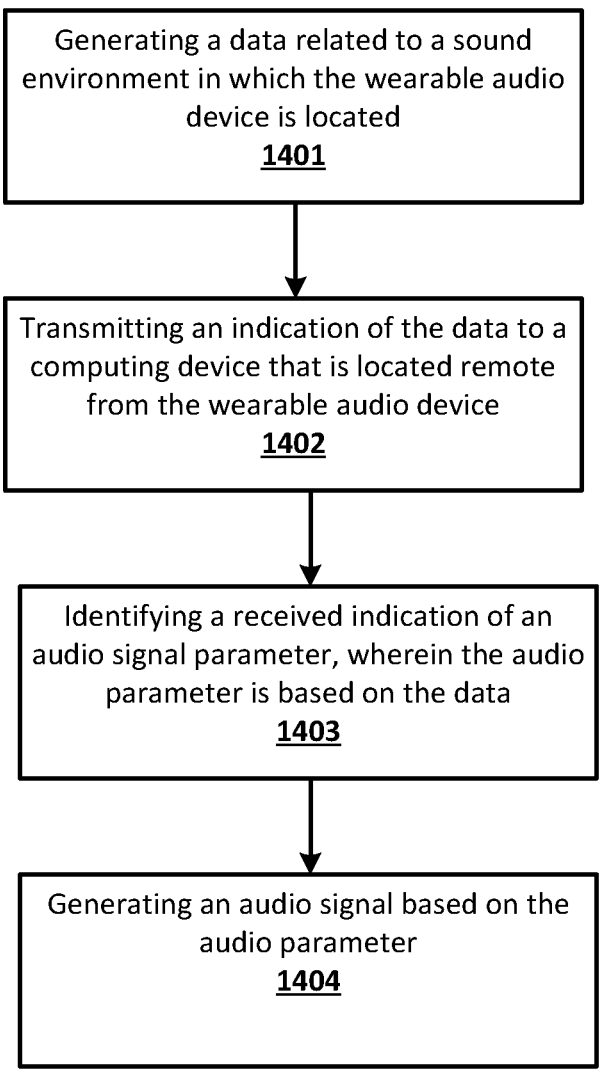
FIG. 14 depicts an example simplified technique for use by a wearable audio device, in accordance with various embodiments.

FIG. 14 depicts an example simplified technique for use by a wearable audio device, in accordance with various embodiments. Generally, the technique may be considered as a contextualization and example use of various other techniques described herein.

The technique may include generating, at 1401, a data related to a sound environment in which the wearable audio device is located. The data may be, for example, one or more sound clips recorded by microphones such as microphones 201 or 202. The data may additionally or alternatively include data such as geo-location data, timestamp data, user preferences (e.g., as input through a user-accessible button 205), data from a sensor 220, etc.

The technique may further include transmitting, at 1402, an indication of the data to a computing device that is located remote from the wearable audio device. The transmission may be performed using a transceiver such as transceiver 214, an antenna such as antenna 221, a SIM module such as SIM module 222, etc. The computing device may be a mobile device such as mobile devices 103a-103n, a server such as server 104, a cellular tower or short-range wireless signal router or repeater, or some other computing device. The indication may be, for example, some or all of the data collected at 1401, information related to the data (e.g., metadata), a compressed version of the data, etc.

The technique may further include identifying, at 1403, a received indication of an audio signal parameter. Similarly to the transmission of at 1402, the audio signal parameter may be received from a mobile device, a cellular tower, a server, a short-range wireless signal repeater or router, etc. The indication may be the parameter itself, an indication of an entry in a data table by which the parameter may be identified, an indication of a change from a previous parameter, etc. Generally, the parameter may be based on the data transmitted at 1402, for example after processing of the data by the neural network as described above. The audio signal parameter may be, for example, a beam forming parameter, an equalizer setting, etc.

The technique may then include generating an audio signal based on the audio parameter at 1404. Specifically, the received parameter may be stored in control parameters 212 (or some other type of storage) for use by the sound processor unit 219 during generation of or playback of an audio signal as described above.

FIG. 15 depicts an example simplified technique for use by a neural network, in accordance with various embodiments. Similarly to FIG. 14, FIG. 15 may be considered as a contextualization and example use of various other techniques described herein. The technique may be performed, in whole or in part, by an electronic device that is running all or part of a neural network (e.g., the server 104 running the neural network 107), or distributed across various elements or electronic devices of the system architecture as described above.

The technique may include identifying, at 1501, an environmental parameter generated by a wearable audio device that is remote from the electronic device. The environmental parameter may be related to a sound environment in which the wearable audio device is located. For example, the environmental parameter may include one or more sound recordings, geo-location data, timestamp data, or some other data which may be placed in a payload provided by a wearable audio device or a mobile device as described above.

The technique may further include identifying, at 1502, based on the environmental parameter and a pre-identified weight, an audio parameter that is to be used by the wearable audio device for an audio signal. The pre-identified weight may relate to sound-environment classification such as that which may be performed in accordance with FIG. 3 or 4 or some other Figure herein. The pre-identified weight may be, for example, one of the weights identified at 305. In some embodiments, the pre-identified weight may additionally or alternatively relate to one of the weights identified at 705 as described above. Generally, the weight may be used to identify an audio parameter as described with respect to, for example, FIG. 8.

The technique may then include outputting, at 1503, an indication of the audio parameter. The indication may be similar to the indication discussed above at element 1403. The audio parameter may be a beamforming parameter, and equalizer parameter, or some other parameter as described herein. The audio parameter may be output directly to a wearable audio device (e.g., through a cellular connection which may include one or more cellular repeaters or towers) or to a mobile device which may then forward the indication (or some other information related to the indication) to the wearable audio device.

FIG. 16 depicts an example simplified technique for training a neural network, in accordance with various embodiments. Similarly to FIG. 15, FIG. 16 may be considered as a contextualization and example use of various other techniques described herein. The technique may be performed, in whole or in part, by an electronic device that is running all or part of a neural network (e.g., the server 104 running the neural network 107), or distributed across various elements or electronic devices of the system architecture as described above.

The technique may include identifying, at 1601, a first weight related to classification, based on an audio parameter, of a sound environment in which a remote wearable audio device is located. The weight may be, for example, a weight as identified at element 304 and 305 of FIG. 3.

The technique may further include identifying, at 1602, a second weight related a parameter setting for the remote wearable audio device. The weight may be, for example, a weight as identified at element 704 and 705 of FIG. 7.

The technique may further include identifying, at 1603, a third weight related to prediction of a sound level of a sound environment. The weight may be similar to, for example, a weight as identified at element 902 and 904 of FIG. 9.

The technique may then include storing the first, second, and third weights in the database at 1604. The weights may be stored for use as described in, for example, FIGS. 4, 8, and 10 above.

It will be understood that the example techniques of FIGS. 12-16 are intended as simplified example techniques, and may include one or more variations as described with respect to FIGS. 3-10. Other embodiments may include more or fewer elements than depicted, or elements occurring in a different order than depicted (sequentially instead of concurrently, or vice-versa, or certain elements occurring before others). In some embodiments, certain elements may be combined, or an element depicted as a unitary element may be formed of a plurality of elements with distinct functionality. In some embodiments, certain of the techniques or elements may be distributed across a number of physical structures (e.g., a database and a wearable audio device, multiple elements of a wearable audio device, etc.). Other variations may be present in other embodiments.

Figure 17:
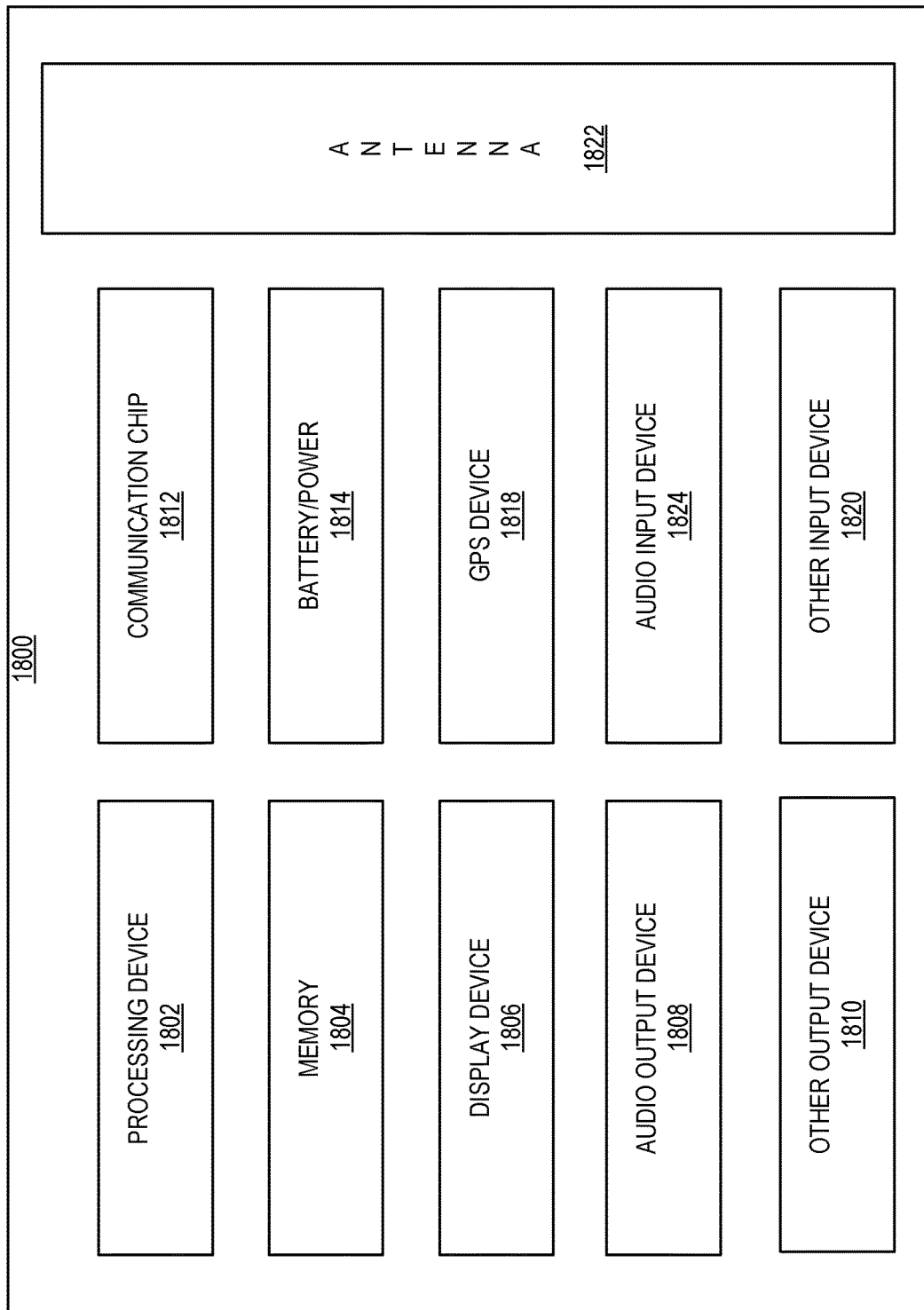
FIG. 17 is a block diagram of an example electrical device that may relate to operation of a neural network, in accordance with various embodiments.

FIG. 17 is a block diagram of an example electrical device 1800 that may be or include a mobile device such as mobile devices 103a-103n, a wearable audio device such as wearable audio devices 101a-101n, or a server 104. Specifically, the electrical device 1800 may include elements of or related to a neural network such as that discussed herein, in accordance with any of the embodiments disclosed herein. A number of components are illustrated in FIG. 17 as included in the electrical device 1800, but any one or more of these components may be omitted or duplicated, as suitable for the application. In some embodiments, some or all of the components included in the electrical device 1800 may be attached to one or more motherboards. In some embodiments, some or all of these components are fabricated onto a single system-on-a-chip (SoC) die.

Additionally, in various embodiments, the electrical device 1800 may not include one or more of the components illustrated in FIG. 17, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more DSPs, ASICs, field-programmable gate arrays (FPGAs), CPUs, GPUs, cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random-access memory (eDRAM) or spin transfer torque magnetic random-access memory (STT-MRAM).

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including WIFI (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as WIFI or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include another output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include another input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a handheld or mobile electrical device (e.g., a cell phone, a smart phone, a mobile internet device, a music player, a tablet computer, a laptop computer, a netbook computer, an ultrabook computer, a PDA, an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 1800 may be any other electronic device that processes data.

EXAMPLES OF VARIOUS EMBODIMENTS

Example 1 a wearable audio device comprising: a sensor to generate a data related to a sound environment in which the wearable audio device is located; a transmit module to transmit an indication of the data to a computing device that is located remote from the wearable audio device; a receive module to receive, from the computing device, an indication of an audio signal parameter, wherein the audio parameter is based on the data; and a speaker to generate an audio signal based on the audio parameter.

Example 2 includes the wearable audio device of example 1, wherein the sensor is a microphone.

Example 3 includes the wearable audio device of example 1, wherein the sensor is an accelerometer, a magnetometer, a gyroscope, an air pressure monitor, a capacitive sensor, a proximity sensor, an atmospheric sensor, a temperature sensor, an ultraviolet radiation sensor, or an air pollution sensor.

Example 4 includes the wearable audio device of example 1, wherein the audio parameter is generated by a neural network based on pre-identified weights.

Example 5 includes the wearable audio device of example 1, wherein the indication of the audio signal parameter is an indication of information to be used by a neural network on one or more processors of the wearable audio device, wherein the neural network is to generate the audio signal parameter.

Example 6 includes the wearable audio device of example 1, wherein the computing device is a mobile phone to which the wearable audio device is communicatively coupled.

Example 7 includes the wearable audio device of example 1, wherein the computing device is a server to which the wearable audio device is communicatively coupled.

Example 8 includes the wearable audio device of example 7, wherein the wearable audio device is communicatively coupled with the server through an intermediate mobile device.

Example 9 includes the wearable audio device of example 1, wherein the wearable audio device includes an earbud or headphones.

Example 10 includes the wearable audio device of example 1, wherein the audio parameter is further based on pre-identified data related to the sound environment.

Example 11 includes the wearable audio device of example 10, wherein the pre-identified data relates to a location of the sound environment or audio data of the sound environment.

Example 12 includes the wearable audio device of example 1, wherein the wearable audio device further includes an indicator that is to provide an indication of a pre-identified condition of an environment in which the wearable audio device is located.

Example 13 includes the wearable audio device of example 12, wherein the pre-identified condition relates to an air quality measurement or environmental measure of the environment.

Example 14 includes the wearable audio device of example 12, wherein the pre-identified condition relates to a sound level of the environment.

Example 15 includes an electronic device comprising: a memory to store a database that includes a pre-identified weight related to sound environment classification; and a processor coupled with the memory, the processor to: identify an environmental parameter generated by a wearable audio device that is remote from the electronic device, wherein the environmental parameter is related to a sound environment in which the wearable audio device is located; identify, based on the environmental parameter and the pre-identified weight, an audio parameter to be used by the wearable audio device for an audio signal; and output an indication of the audio parameter.

Example 16 includes the electronic device of example 15, wherein the pre-identified weight is based on an audio characteristic of the sound environment or a location of the sound environment.

Example 17 includes the electronic device of example 15, wherein the audio parameter is a beamformer parameter, an equalizer setting, a noise cancellation setting, a noise reduction setting, or a control parameter.

Example 18 includes the electronic device of example 15, wherein the electronic device is a mobile phone.

Example 19 includes the electronic device of example 15, wherein the electronic device is a server.

Example 20 includes the electronic device of example 15, wherein the processor is further to update the pre-identified weight based on the environmental parameter.

Example 21 includes the electronic device of example 15, wherein the processor is further to update the pre-identified weight based on an indication of user feedback.

Example 22 includes the electronic device of example 15, wherein the pre-identified weight is related to sound environment classification, a speaker parameter setting prediction, or a sound level prediction.

Example 23 includes the electronic device of example 15, wherein the environmental parameter is related to a location of the sound environment or an audio parameter of the sound environment.

Example 24 includes an electronic device comprising: a memory to store a database related to a neural network; and a processor coupled with the memory, wherein the processor is to: identify a first weight related to classification, based on an audio parameter, of a sound environment in which a remote wearable audio device is located; identify a second weight related to an optimal parameter setting for the remote wearable audio device; identify a third weight related to classification of a sound level of the sound environment; and store the first weight, second weight, and third weight in the database.

Example 25 includes the electronic device of example 24, wherein the processor is to identify the first weight based on a training process related to a plurality of audio parameters of a plurality of sound environments.

Example 26 includes the electronic device of example 24, wherein the sound environment is a cafe, an airplane, or a city street.

Example 27 includes the electronic device of example 24, wherein the sound environment includes a pre-identified noise or subset of noises that are to be accentuated or removed.

Example 28 includes the electronic device of example 24, wherein the processor is to identify the second weight based on a training process related to a plurality of speaker parameter settings previously used in a plurality of sound environments.

Example 29 includes the electronic device of example 24, wherein the optimal parameter setting is related to a beamformer parameter, an equalizer setting, a noise cancellation setting, a noise reduction setting, or a control parameter.

Example 30 includes the electronic device of example 24, wherein the processor is to identify the third weight based on a training process related to a plurality of geographical parameters of a plurality of sound environments.

Example 31 includes the electronic device of example 24, wherein the second weight is based on the first weight and the third weight.

Example 32 includes the electronic device of example 24, wherein the processor is further to output an indication of the second weight for use by a wearable audio device during generation of an audio signal.

Example 33 includes the electronic device of example 32, wherein the audio signal relates to compensation of loss of hearing by a user of the wearable audio device.

Example 34 includes the electronic device of example 32, wherein the audio signal relates to accentuation or elimination of a subset of noises in the environment in which the wearable audio device is located.

Example 35 includes a method of operating a wearable audio device, wherein the method comprises: generating, by a sensor of the wearable audio device, a data related to a sound environment in which the wearable audio device is located; facilitating, by a transmit module of the wearable audio device, transmission of an indication of the data to a computing device that is located remote from the wearable audio device; identifying, by a receive module of the wearable audio device in a signal received from the computing device, an indication of an audio signal parameter, wherein the audio parameter is based on the data; and generating, by a speaker of the wearable audio device, an audio signal based on the audio parameter.

Example 36 includes the method of example 35, wherein the sensor is a microphone.

Example 37 includes the method of example 35, wherein the sensor is an accelerometer, a magnetometer, a gyroscope, an air pressure monitor, a capacitive sensor, a proximity sensor, an atmospheric sensor, a temperature sensor, an ultraviolet radiation sensor, or an air pollution sensor.

Example 38 includes the method of example 35, further comprising generating, by a neural network, the audio parameter based on pre-identified weights.

Example 39 includes the method of example 35, further comprising generating, by a neural network on one or more processors of the wearable audio device, the audio signal parameter based on the indication.

Example 40 includes the method of example 35, wherein the computing device is a mobile phone to which the wearable audio device is communicatively coupled.

Example 41 includes the method of example 35, wherein the computing device is a server to which the wearable audio device is communicatively coupled.

Example 42 includes the method of example 41, wherein the wearable audio device is communicatively coupled with the server through an intermediate mobile device.

Example 43 includes the method of example 35, wherein the wearable audio device includes an earbud or headphones.

Example 44 includes the method of example 35, wherein the audio parameter is further based on pre-identified data related to the sound environment.

Example 45 includes the method of example 44, wherein the pre-identified data relates to a location of the sound environment or audio data of the sound environment.

Example 46 includes the method of example 35, further comprising providing, by an indicator of the wearable audio device, an indication of a pre-identified condition of an environment in which the wearable audio device is located.

Example 47 includes the method of example 46, wherein the pre-identified condition relates to an air quality measurement or environmental measure of the environment.

Example 48 includes the method of example 46, wherein the pre-identified condition relates to a sound level of the environment.

Example 49 includes a method of operating an electronic device, wherein the method comprises: identifying an environmental parameter generated by a wearable audio device that is remote from the electronic device, wherein the environmental parameter is related to a sound environment in which the wearable audio device is located; identifying, based on the environmental parameter and a pre-identified weight, an audio parameter to be used by the wearable audio device for an audio signal, wherein the pre-identified weight is related to a sound environment and stored in a database; and outputting an indication of the audio parameter.

Example 50 includes the method of example 49, wherein the pre-identified weight is based on an audio characteristic of the sound environment or a location of the sound environment.

Example 51 includes the method of example 49, wherein the audio parameter is a beamformer parameter, an equalizer setting, a noise cancellation setting, a noise reduction setting, or a control parameter.

Example 52 includes the method of example 49, wherein the electronic device is a mobile phone.

Example 53 includes the method of example 49, wherein the electronic device is a server.

Example 54 includes the method of example 49, further comprising updating the pre-identified weight based on the environmental parameter.

Example 55 includes the method of example 49, further comprising updating the pre-identified weight based on an indication of user feedback.

Example 56 includes the method of example 49, wherein the pre-identified weight is related to sound environment classification, a speaker parameter setting prediction, or a sound level prediction.

Example 57 includes the method of example 49, wherein the environmental parameter is related to a location of the sound environment or an audio parameter of the sound environment.

Example 58 includes a method of operating an electronic device, wherein the method comprises: identifying a first weight related to classification, based on an audio parameter, of a sound environment in which a remote wearable audio device is located; identifying a second weight related to an optimal parameter setting for the remote wearable audio device; identifying a third weight related to classification of a sound level of the sound environment; and storing the first weight, second weight, and third weight in a database related to a neural network.

Example 59 includes the method of example 58, further comprising identifying the first weight based on a training process related to a plurality of audio parameters of a plurality of sound environments.

Example 60 includes the method of example 58, wherein the sound environment is a cafe, an airplane, or a city street.

Example 61 includes the method of example 58, wherein the sound environment includes a pre-identified noise or subset of noises that are to be accentuated or removed.

Example 62 includes the method of example 58, further comprising identifying the second weight based on a training process related to a plurality of speaker parameter settings previously used in a plurality of sound environments.

Example 63 includes the method of example 58, wherein the optimal parameter setting is related to a beamformer parameter, an equalizer setting, a noise cancellation setting, a noise reduction setting, or a control parameter.

Example 64 includes the method of example 58, further comprising identifying the third weight based on a training process related to a plurality of geographical parameters of a plurality of sound environments.

Example 65 includes the method of example 58, wherein the second weight is based on the first weight and the third weight.

Example 66 includes the method of example 58, further comprising outputting an indication of the second weight for use by a wearable audio device during generation of an audio signal.

Example 67 includes the method of example 66, wherein the audio signal relates to compensation of loss of hearing by a user of the wearable audio device.

Example 68 includes the method of example 66, wherein the audio signal relates to accentuation or elimination of a subset of noises in the environment in which the wearable audio device is located.

Example 69 includes one or more non-transitory computer-readable media comprising instructions that, upon execution of the instructions by one or more processors of a wearable audio device, are to cause the wearable audio device to: generate, by a sensor of the wearable audio device, a data related to a sound environment in which the wearable audio device is located; facilitate, by a transmit module of the wearable audio device, transmission of an indication of the data to a computing device that is located remote from the wearable audio device; identify, by a receive module of the wearable audio device in a signal received from the computing device, an indication of an audio signal parameter, wherein the audio parameter is based on the data; and generate, by a speaker of the wearable audio device, an audio signal based on the audio parameter.

Example 70 includes the one or more non-transitory computer-readable media of example 69, wherein the sensor is a microphone.

Example 71 includes the one or more non-transitory computer-readable media of example 69, wherein the sensor is an accelerometer, a magnetometer, a gyroscope, an air pressure monitor, a capacitive sensor, a proximity sensor, an atmospheric sensor, a temperature sensor, an ultraviolet radiation sensor, or an air pollution sensor.

Example 72 includes the one or more non-transitory computer-readable media of example 69, wherein the instructions are further to generate the audio parameter by a neural network based on pre-identified weights.

Example 73 includes the one or more non-transitory computer-readable media of example 69, wherein the instructions are further to generate, by a neural network on one or more processors of the wearable audio device, the audio signal parameter based on the indication.

Example 74 includes the one or more non-transitory computer-readable media of example 69, wherein the computing device is a mobile phone to which the wearable audio device is communicatively coupled.

Example 75 includes the one or more non-transitory computer-readable media of example 69, wherein the computing device is a server to which the wearable audio device is communicatively coupled.

Example 76 includes the one or more non-transitory computer-readable media of example 75, wherein the wearable audio device is communicatively coupled with the server through an intermediate mobile device.

Example 77 includes the one or more non-transitory computer-readable media of example 69, wherein the wearable audio device includes an earbud or headphones.

Example 78 includes the one or more non-transitory computer-readable media of example 69, wherein the audio parameter is further based on pre-identified data related to the sound environment.

Example 79 includes the one or more non-transitory computer-readable media of example 78, wherein the pre-identified data relates to a location of the sound environment or audio data of the sound environment.

Example 80 includes the one or more non-transitory computer-readable media of example 69, wherein the instructions are further to provide, by an indicator of the wearable audio device, an indication of a pre-identified condition of an environment in which the wearable audio device is located.

Example 81 includes the one or more non-transitory computer-readable media of example 80, wherein the pre-identified condition relates to an air quality measurement or environmental measure of the environment.

Example 82 includes the one or more non-transitory computer-readable media of example 80, wherein the pre-identified condition relates to a sound level of the environment.

Example 83 includes one or more non-transitory computer-readable media comprising instructions that, upon execution of the instructions by one or more processors of an electronic device, are to cause the electronic device to: identify an environmental parameter generated by a wearable audio device that is remote from the electronic device, wherein the environmental parameter is related to a sound environment in which the wearable audio device is located; identify, based on the environmental parameter and a pre-identified weight, an audio parameter to be used by the wearable audio device for an audio signal, wherein the pre-identified weight is related to a sound environment and stored in a database; and output an indication of the audio parameter.

Example 84 includes the one or more non-transitory computer-readable media of example 83, wherein the pre-identified weight is based on an audio characteristic of the sound environment or a location of the sound environment.

Example 85 includes the one or more non-transitory computer-readable media of example 83, wherein the audio parameter is a beamformer parameter, an equalizer setting, a noise cancellation setting, a noise reduction setting, or a control parameter.

Example 86 includes the one or more non-transitory computer-readable media of example 83, wherein the electronic device is a mobile phone.

Example 87 includes the one or more non-transitory computer-readable media of example 83, wherein the electronic device is a server.

Example 88 includes the one or more non-transitory computer-readable media of example 83, wherein the instructions are further to update the pre-identified weight based on the environmental parameter.

Example 89 includes the one or more non-transitory computer-readable media of example 83, wherein the instructions are further to update the pre-identified weight based on an indication of user feedback.

Example 90 includes the one or more non-transitory computer-readable media of example 83, wherein the pre-identified weight is related to sound environment classification, a speaker parameter setting prediction, or a sound level prediction.

Example 91 includes the one or more non-transitory computer-readable media of example 83, wherein the environmental parameter is related to a location of the sound environment or an audio parameter of the sound environment.

Example 92 includes one or more non-transitory computer-readable media comprising instructions that, upon execution of the instructions by one or more processors of an electronic device, are to cause the electronic device to: identify a first weight related to classification, based on an audio parameter, of a sound environment in which a remote wearable audio device is located; identify a second weight related to an optimal parameter setting for the remote wearable audio device; identify a third weight related to classification of a sound level of the sound environment; and store the first weight, second weight, and third weight in a database related to a neural network.

Example 93 includes the one or more non-transitory computer-readable media of example 92, wherein the instructions are further to identify the first weight based on a training process related to a plurality of audio parameters of a plurality of sound environments.

Example 94 includes the one or more non-transitory computer-readable media of example 92, wherein the sound environment is a cafe, an airplane, or a city street.

Example 95 includes the one or more non-transitory computer-readable media of example 92, wherein the sound environment includes a pre-identified noise or subset of noises that are to be accentuated or removed.

Example 96 includes the one or more non-transitory computer-readable media of example 92, wherein the instructions are further to identify the second weight based on a training process related to a plurality of speaker parameter settings previously used in a plurality of sound environments.

Example 97 includes the one or more non-transitory computer-readable media of example 92, wherein the optimal parameter setting is related to a beamformer parameter, an equalizer setting, a noise cancellation setting, a noise reduction setting, or a control parameter.

Example 98 includes the one or more non-transitory computer-readable media of example 92, wherein the instructions are further to identify the third weight based on a training process related to a plurality of geographical parameters of a plurality of sound environments.

Example 99 includes the one or more non-transitory computer-readable media of example 92, wherein the second weight is based on the first weight and the third weight.

Example 100 includes the one or more non-transitory computer-readable media of example 92, wherein the instructions are further to output an indication of the second weight for use by a wearable audio device during generation of an audio signal.

Example 101 includes the one or more non-transitory computer-readable media of example 100, wherein the audio signal relates to compensation of loss of hearing by a user of the wearable audio device.

Example 102 includes the one or more non-transitory computer-readable media of example 100, wherein the audio signal relates to accentuation or elimination of a subset of noises in the environment in which the wearable audio device is located.

Example 103 includes a wearable audio device comprising: means to generate a data related to a sound environment in which the wearable audio device is located; means to facilitate transmission of an indication of the data to a computing device that is located remote from the wearable audio device; means to identify, in a signal received from the computing device, an indication of an audio signal parameter, wherein the audio parameter is based on the data; and means to generate an audio signal based on the audio parameter.

Example 104 includes the wearable audio device of example 103, wherein the sensor means to generate the data include a microphone.

Example 105 includes the wearable audio device of example 103, wherein the means to generate the data include an accelerometer, a magnetometer, a gyroscope, an air pressure monitor, a capacitive sensor, a proximity sensor, an atmospheric sensor, a temperature sensor, an ultraviolet radiation sensor, or an air pollution sensor.

Example 106 includes the wearable audio device of example 103, further comprising means to generate the audio parameter by a neural network based on pre-identified weights.

Example 107 includes the wearable audio device of example 103, further comprising means to generate, by a neural network on one or more processors of the wearable audio device, the audio signal parameter based on the indication.

Example 108 includes the wearable audio device of example 103, wherein the computing device is a mobile phone to which the wearable audio device is communicatively coupled.

Example 109 includes the wearable audio device of example 103, wherein the computing device is a server to which the wearable audio device is communicatively coupled.

Example 110 includes the wearable audio device of example 109, wherein the wearable audio device is communicatively coupled with the server through an intermediate mobile device.

Example 111 includes the wearable audio device of example 103, wherein the wearable audio device includes an earbud or headphones.

Example 112 includes the wearable audio device of example 103, wherein the audio parameter is further based on pre-identified data related to the sound environment.

Example 113 includes the wearable audio device of example 112, wherein the pre-identified data relates to a location of the sound environment or audio data of the sound environment.

Example 114 includes the wearable audio device of example 103, further comprising means to provide, by an indicator of the wearable audio device, an indication of a pre-identified condition of an environment in which the wearable audio device is located.

Example 115 includes the wearable audio device of example 114, wherein the pre-identified condition relates to an air quality measurement or environmental measure of the environment.

Example 116 includes the one or more non-transitory computer-readable media of example 114, wherein the pre-identified condition relates to a sound level of the environment.

Example 117 includes an electronic device comprising: means to identify an environmental parameter generated by a wearable audio device that is remote from the electronic device, wherein the environmental parameter is related to a sound environment in which the wearable audio device is located; means to identify, based on the environmental parameter and a pre-identified weight, an audio parameter to be used by the wearable audio device for an audio signal, wherein the pre-identified weight is related to a sound environment and stored in a database; and means to output an indication of the audio parameter.

Example 118 includes the electronic device of example 117, wherein the pre-identified weight is based on an audio characteristic of the sound environment or a location of the sound environment.

Example 119 includes the electronic device of example 117, wherein the audio parameter is a beamformer parameter, an equalizer setting, a noise cancellation setting, a noise reduction setting, or a control parameter.

Example 120 includes the electronic device of example 117, wherein the electronic device is a mobile phone.

Example 121 includes the electronic device of example 117, wherein the electronic device is a server.

Example 122 includes the electronic device of example 117, further comprising means to update the pre-identified weight based on the environmental parameter.

Example 123 includes the electronic device of example 117, further comprising means to update the pre-identified weight based on an indication of user feedback.

Example 124 includes the electronic device of example 117, wherein the pre-identified weight is related to sound environment classification, a speaker parameter setting prediction, or a sound level prediction.

Example 125 includes the electronic device of example 117, wherein the environmental parameter is related to a location of the sound environment or an audio parameter of the sound environment.

Example 126 includes an electronic device comprising: means to identify a first weight related to classification, based on an audio parameter, of a sound environment in which a remote wearable audio device is located; means to identify a second weight related to an optimal parameter setting for the remote wearable audio device; means to identify a third weight related to classification of a sound level of the sound environment; and means to store the first weight, second weight, and third weight in a database related to a neural network.

Example 127 includes the electronic device of example 126, further comprising means to identify the first weight based on a training process related to a plurality of audio parameters of a plurality of sound environments.

Example 128 includes the electronic device of example 126, wherein the sound environment is a cafe, an airplane, or a city street.

Example 129 includes the electronic device of example 126, wherein the sound environment includes a pre-identified noise or subset of noises that are to be accentuated or removed.

Example 130 includes the electronic device of example 126, further comprising means to identify the second weight based on a training process related to a plurality of speaker parameter settings previously used in a plurality of sound environments.

Example 131 includes the electronic device of example 126, wherein the optimal parameter setting is related to a beamformer parameter, an equalizer setting, a noise cancellation setting, a noise reduction setting, or a control parameter.

Example 132 includes the electronic device of example 126, further comprising means to identify the third weight based on a training process related to a plurality of geographical parameters of a plurality of sound environments.

Example 133 includes the electronic device of example 126, wherein the second weight is based on the first weight and the third weight.

Example 134 includes the electronic device of example 126, further comprising means to output an indication of the second weight for use by a wearable audio device during generation of an audio signal.

Example 135 includes the electronic device of example 134, wherein the audio signal relates to compensation of loss of hearing by a user of the wearable audio device.

Example 136 includes the electronic device of example 134, wherein the audio signal relates to accentuation or elimination of a subset of noises in the environment in which the wearable audio device is located.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A wearable audio device comprising:
 a sensor to generate a data related to a sound environment in which the wearable audio device is located;
 a transmit module to transmit an indication of the data to a computing device that is located remote from the wearable audio device;
 a receive module to receive, from the computing device, an indication of an audio signal parameter, wherein the audio signal parameter is based on the data; and
 a speaker to generate an audio signal based on the audio signal parameter,
 wherein the audio signal parameter is generated by a neural network based on pre-identified weights, and wherein the neural network is to update a weight of the pre-identified weights based on user feedback.

2. The wearable audio device of claim 1, wherein the sensor is a microphone.

3. The wearable audio device of claim 1, wherein the sensor is an accelerometer, a magnetometer, a gyroscope, an air pressure monitor, a capacitive sensor, a proximity sensor, an atmospheric sensor, a temperature sensor, an ultraviolet radiation sensor, or an air pollution sensor.

4. The wearable audio device of claim 1, wherein the indication of the audio signal parameter is an indication of information to be used by a neural network on one or more processors of the wearable audio device, wherein the neural network is to generate the audio signal parameter.

5. The wearable audio device of claim 1, wherein the wearable audio device includes an earbud or headphones.

6. The wearable audio device of claim 1, wherein the audio parameter is further based on pre-identified data related to the sound environment.

7. An electronic device comprising:
 a memory to store a database that includes a pre-identified weight related to sound environment classification; and
 a processor coupled with the memory, the processor to:
  identify an environmental parameter generated by a wearable audio device that is remote from the electronic device, wherein the environmental parameter is related to a sound environment in which the wearable audio device is located;
  identify, based on the environmental parameter and the pre-identified weight, an audio parameter to be used by the wearable audio device for an audio signal;
  update the pre-identified weight based on the environmental parameter; and
  output an indication of the audio parameter.

8. The electronic device of claim 7, wherein the pre-identified weight is based on an audio characteristic of the sound environment or a location of the sound environment.

9. The electronic device of claim 7, wherein the audio parameter is a beamformer parameter, an equalizer setting, a noise cancellation setting, a noise reduction setting, or a control parameter.

10. The electronic device of claim 7, wherein the processor is further to update the pre-identified weight based on an indication of user feedback.

11. The electronic device of claim 7, wherein the pre-identified weight is related to sound environment classification, a speaker parameter setting prediction, or a sound level prediction.

12. The electronic device of claim 7, wherein the environmental parameter is related to a location of the sound environment or an audio parameter of the sound environment.

13. An electronic device comprising:
 a memory to store a database related to a neural network; and
 a processor coupled with the memory, wherein the processor is to:

identify a first weight related to classification, based on an audio parameter, of a sound environment in which a remote wearable audio device is located;
identify a second weight related to an optimal parameter setting for the remote wearable audio device;
identify a third weight related to classification of a sound level of the sound environment; and
store the first weight, second weight, and third weight in the database.

14. The electronic device of claim 13, wherein the processor is to identify the first weight based on a training process related to a plurality of audio parameters of a plurality of sound environments.

15. The electronic device of claim 13, wherein the processor is to identify the second weight based on a training process related to a plurality of speaker parameter settings previously used in a plurality of sound environments.

16. The electronic device of claim 13, wherein the processor is to identify the third weight based on a training process related to a plurality of geographical parameters of a plurality of sound environments.

17. The electronic device of claim 13, wherein the second weight is based on the first weight and the third weight.

18. The electronic device of claim 13, wherein the processor is further to output an indication of the second weight for use by a wearable audio device during generation of an audio signal.

* * * * *